(12) United States Patent
Gould et al.

(10) Patent No.: US 11,287,258 B2
(45) Date of Patent: Mar. 29, 2022

(54) LASER PROJECTION TOOLS AND MOUNTING ACCESSORIES

(71) Applicant: Milwaukee Electric Tool Corporation, Brookfield, WI (US)

(72) Inventors: Samuel A. Gould, West Allis, WI (US); Benjamin T. Jones, St. Francis, WI (US); Andrew Kenneth Dorscheid, Waunakee, WI (US); Gregory R. Strommen, Greendale, WI (US); Jacob D. Hadfield, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 140 days.

(21) Appl. No.: 16/776,273

(22) Filed: Jan. 29, 2020

(65) Prior Publication Data

US 2020/0225034 A1 Jul. 16, 2020

Related U.S. Application Data

(63) Continuation of application No. PCT/US2020/013877, filed on Jan. 16, 2020.

(60) Provisional application No. 62/793,151, filed on Jan. 16, 2019, provisional application No. 62/872,091, filed on Jul. 9, 2019.

(51) Int. Cl.
*G01C 15/00* (2006.01)
*G01B 11/26* (2006.01)
*B25F 5/02* (2006.01)
*B23Q 17/22* (2006.01)

(52) U.S. Cl.
CPC ....... *G01C 15/004* (2013.01); *B23Q 17/2233* (2013.01); *B25F 5/021* (2013.01); *G01B 11/26* (2013.01)

(58) Field of Classification Search
None
See application file for complete search history.

(56) References Cited

U.S. PATENT DOCUMENTS

| | | | |
|---|---|---|---|
| 5,144,487 A | 9/1992 | Hersey |
| 5,218,770 A | 6/1993 | Toga |
| 5,539,990 A | 7/1996 | Le |
| 5,572,796 A | 11/1996 | Breda |
| 5,575,073 A | 11/1996 | von Wedemayer |
| 5,581,900 A | 12/1996 | Payne |

(Continued)

FOREIGN PATENT DOCUMENTS

| | | |
|---|---|---|
| CN | 201057516 | 5/2008 |
| CN | 201885711 | 6/2011 |

(Continued)

OTHER PUBLICATIONS

International Search Report and Written Opinion for International Application No. PCT/US2020/013877, dated May 11, 2020, 10 pages.

*Primary Examiner* — Christopher W Fulton
(74) *Attorney, Agent, or Firm* — Reinhart Boerner Van Deuren s.c.

(57) ABSTRACT

A laser projection device with compact frame is provided, as is a corresponding frame or mount for one or more laser projection devices. In one embodiment the frame or mount includes a coupling interface that permits multiple coupling positions with respect to a laser projection device, such as at 90 degree intervals.

18 Claims, 24 Drawing Sheets

(56) References Cited

U.S. PATENT DOCUMENTS

| | | | |
|---|---|---|---|
| 5,584,458 A | 12/1996 | Rando | |
| 5,680,208 A | 10/1997 | Butler et al. | |
| 5,799,404 A | 9/1998 | Payne | |
| 5,819,425 A | 10/1998 | Payne | |
| 5,852,493 A | 12/1998 | Monnin | |
| 5,983,510 A * | 11/1999 | Wu | G01C 15/004 33/227 |
| 6,065,217 A | 5/2000 | Dong | |
| 6,167,630 B1 | 1/2001 | Webb | |
| 6,177,987 B1 | 1/2001 | Ting | |
| 6,398,175 B1 | 6/2002 | Conner et al. | |
| 6,459,483 B1 | 10/2002 | Shafer et al. | |
| 6,487,783 B1 | 12/2002 | Thomas, Jr. | |
| 6,532,676 B2 | 11/2003 | Cunningham | |
| 6,741,343 B2 | 5/2004 | Shafer et al. | |
| 6,754,969 B2 | 6/2004 | Waibel | |
| 6,792,685 B1 | 9/2004 | Ng et al. | |
| 6,796,040 B2 | 9/2004 | Ohtomo et al. | |
| D498,687 S | 11/2004 | Lopano | |
| 6,914,930 B2 | 7/2005 | Raskin et al. | |
| 6,931,739 B2 | 8/2005 | Chang et al. | |
| D509,453 S | 9/2005 | Lopano | |
| 6,941,665 B1 | 9/2005 | Budrow et al. | |
| 6,964,106 B2 | 11/2005 | Sergyeyenko et al. | |
| 7,013,570 B2 | 3/2006 | Levine et al. | |
| D526,587 S | 8/2006 | Lopano | |
| 7,100,293 B2 | 9/2006 | Kahle | |
| 7,134,211 B2 | 11/2006 | Bascom et al. | |
| 7,152,334 B2 | 12/2006 | Gamal et al. | |
| 7,237,341 B2 | 7/2007 | Murray | |
| 7,269,908 B1 | 7/2007 | Murray | |
| 7,310,886 B2 | 12/2007 | Bascom et al. | |
| 7,316,073 B2 | 1/2008 | Murray | |
| 7,412,774 B2 * | 8/2008 | Lu | G01C 15/004 33/290 |
| 7,430,810 B2 | 10/2008 | Sergyeyenko et al. | |
| 7,441,981 B2 | 10/2008 | Crain et al. | |
| 7,454,839 B2 * | 11/2008 | Della Bona | F16M 11/14 33/281 |
| 7,481,002 B2 | 1/2009 | Bascom et al. | |
| 7,669,816 B2 | 3/2010 | Crain et al. | |
| 7,675,612 B2 * | 3/2010 | Kallabis | G01C 15/10 356/138 |
| 7,676,939 B2 | 3/2010 | Scheyer | |
| 7,690,124 B1 * | 4/2010 | Henry | G01C 15/004 33/286 |
| 8,087,176 B1 | 1/2012 | Hayes et al. | |
| 8,209,874 B1 * | 7/2012 | Tribble | G01C 15/004 33/286 |
| 8,281,495 B2 | 10/2012 | Hayes et al. | |
| 8,307,562 B2 | 11/2012 | Bascom et al. | |
| 8,511,635 B2 | 8/2013 | Steffen | |
| 8,595,946 B2 | 12/2013 | Hayes et al. | |
| 8,640,350 B2 | 2/2014 | Bascom et al. | |
| 8,668,182 B2 | 3/2014 | Steffen et al. | |
| 8,745,884 B2 | 6/2014 | Hayes | |
| 8,943,701 B2 | 2/2015 | Hayes et al. | |
| 9,303,990 B2 | 4/2016 | Bascom et al. | |
| 9,441,967 B2 * | 9/2016 | Ranieri | G01C 15/004 |
| 9,562,766 B2 | 2/2017 | Bascom et al. | |
| 10,145,676 B2 | 12/2018 | Hayes et al. | |
| 10,344,914 B2 * | 7/2019 | Cardozo | F16M 11/2085 |
| 2001/0034944 A1 | 11/2001 | Cunningham | |
| 2002/0186365 A1 | 12/2002 | Shafer et al. | |
| 2003/0123153 A1 | 7/2003 | Ohtomo et al. | |
| 2004/0172836 A1 | 9/2004 | Ng et al. | |
| 2004/0177523 A1 | 9/2004 | Chang et al. | |
| 2004/0255477 A1 | 12/2004 | Levine et al. | |
| 2005/0078303 A1 | 4/2005 | Murray | |
| 2005/0172502 A1 | 8/2005 | Sergyeyenko et al. | |
| 2006/0037205 A1 | 2/2006 | Sergyeyenko et al. | |
| 2006/0037445 A1 | 2/2006 | Sergyeyenko et al. | |
| 2006/0156563 A1 | 7/2006 | Kahle | |
| 2006/0185181 A1 * | 8/2006 | Long | G01C 15/002 33/286 |
| 2007/0011894 A1 | 1/2007 | Chen | |
| 2007/0056173 A1 * | 3/2007 | Burry | G01C 15/105 33/286 |
| 2007/0056174 A1 | 3/2007 | Bascom et al. | |
| 2007/0175054 A1 | 8/2007 | Murray | |
| 2008/0155842 A1 * | 7/2008 | Kallabis | G01C 15/004 33/286 |
| 2010/0122466 A1 | 5/2010 | Hemingway et al. | |
| 2010/0276554 A1 | 11/2010 | Steffen | |
| 2016/0202056 A1 | 7/2016 | Senger | |
| 2016/0327388 A1 | 11/2016 | Asay | |
| 2017/0314921 A1 | 11/2017 | Spaulding et al. | |
| 2019/0056215 A1 | 2/2019 | Hayes et al. | |

FOREIGN PATENT DOCUMENTS

| | | | |
|---|---|---|---|
| CN | 204807081 | 11/2015 | |
| CN | 107003126 A * | 8/2017 | G01C 15/004 |
| DE | 202012009216 | 2/2013 | |
| DE | 202017001724 | 6/2017 | |
| EP | 0819911 | 6/2002 | |
| EP | 1843128 | 10/2007 | |
| EP | 1939587 | 7/2008 | |
| EP | 3361215 | 8/2018 | |
| EP | 3214403 | 1/2019 | |
| WO | WO9967595 | 12/1999 | |
| WO | WO05024342 | 3/2005 | |
| WO | WO11098608 | 8/2011 | |
| WO | WO15096060 | 7/2015 | |
| WO | WO16037723 | 3/2016 | |
| WO | WO16037724 | 3/2016 | |
| WO | WO18207185 | 11/2018 | |

* cited by examiner

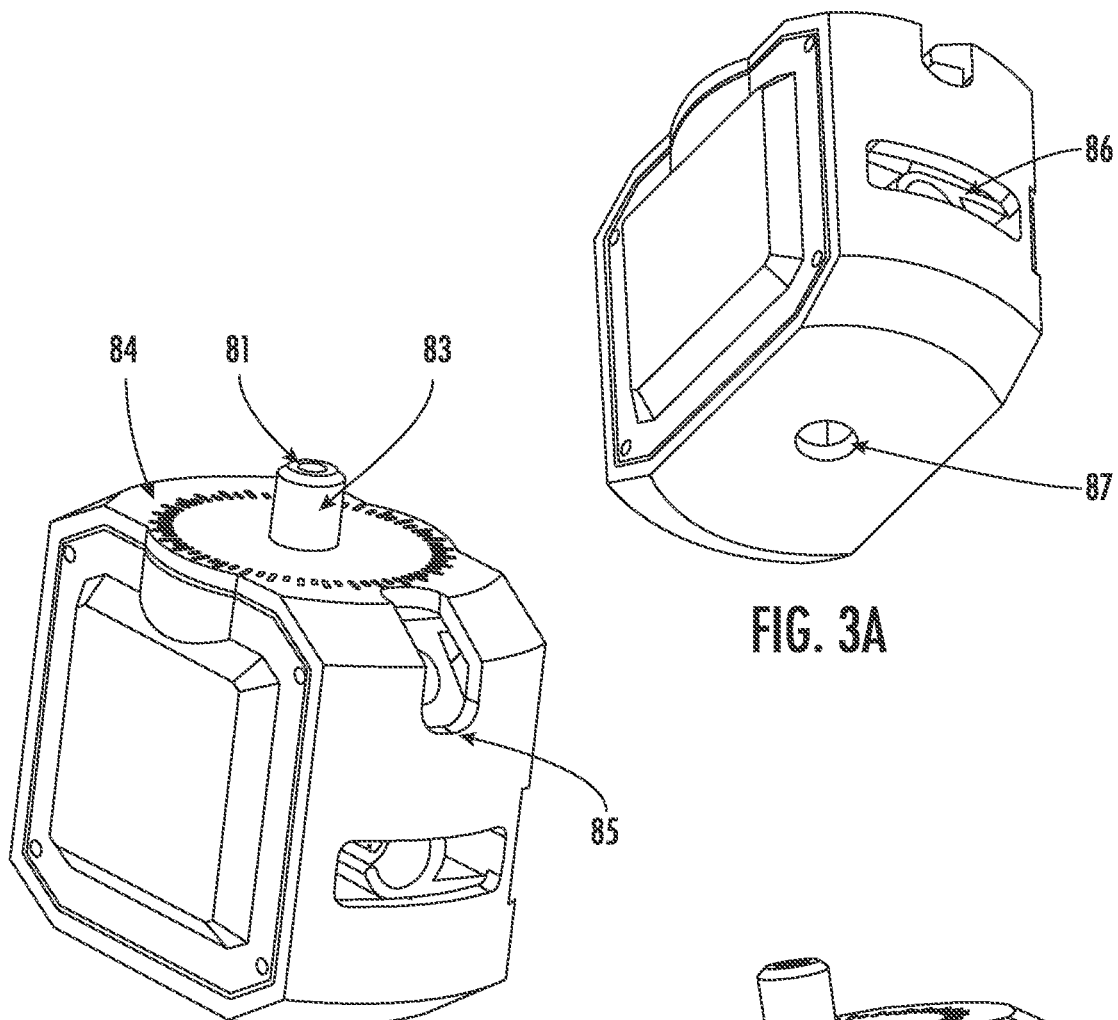
FIG. 3A
FIG. 3B
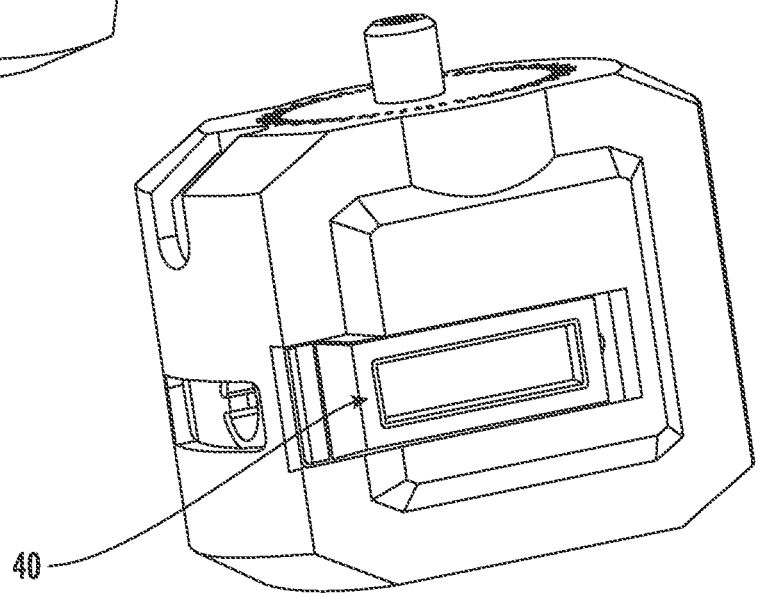
FIG. 3C

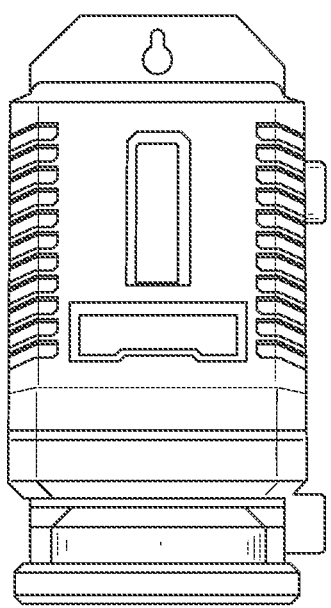
FIG. 7
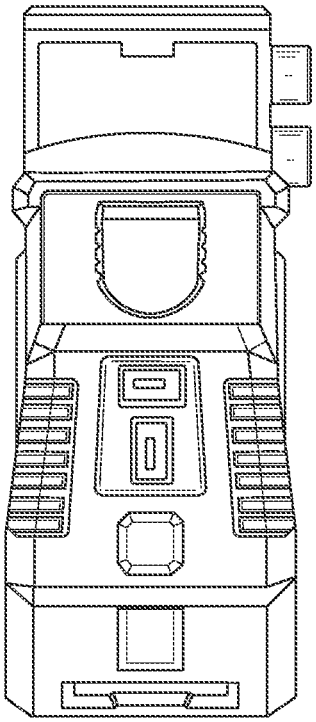
FIG. 8
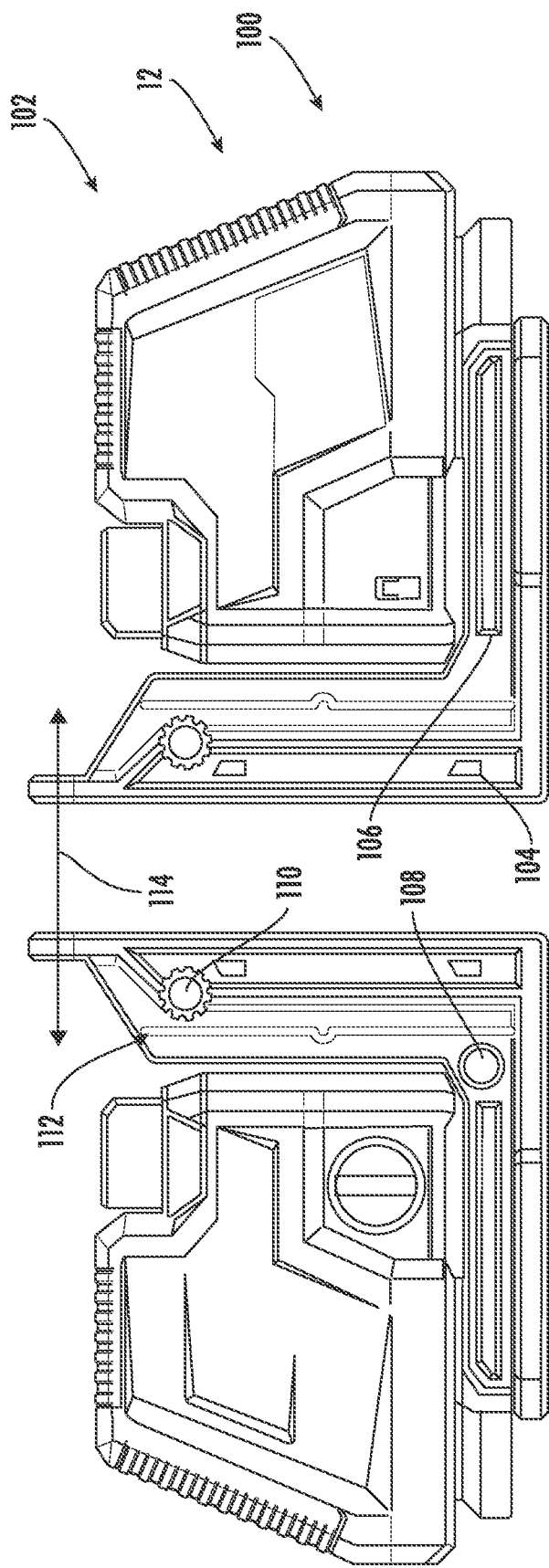
FIG. 9
FIG. 10

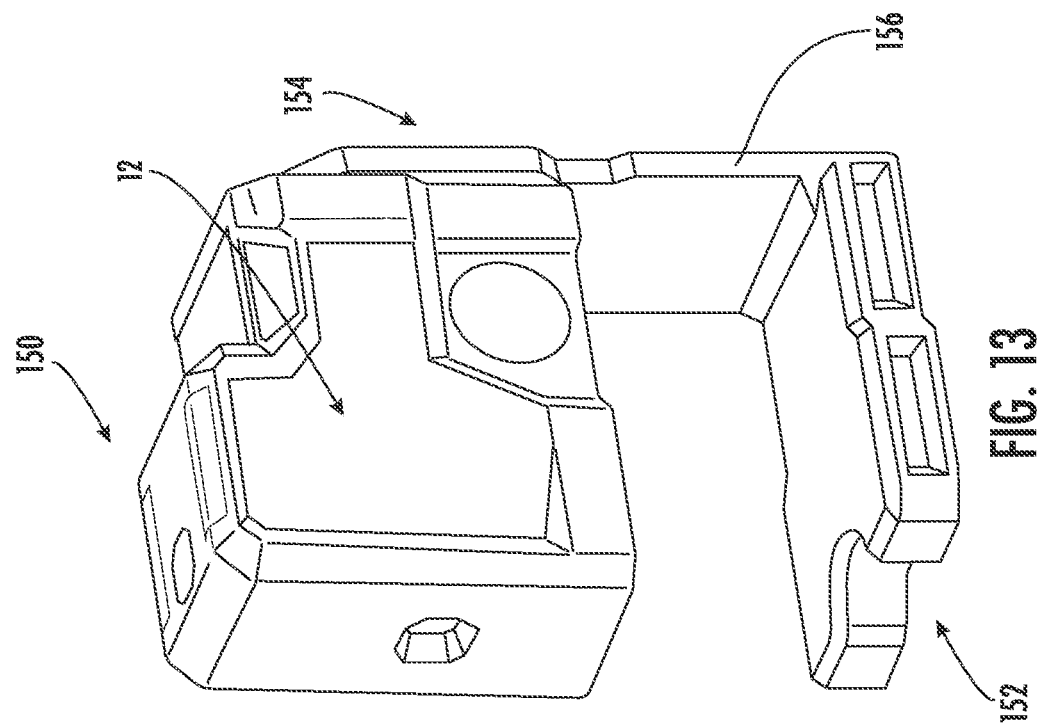
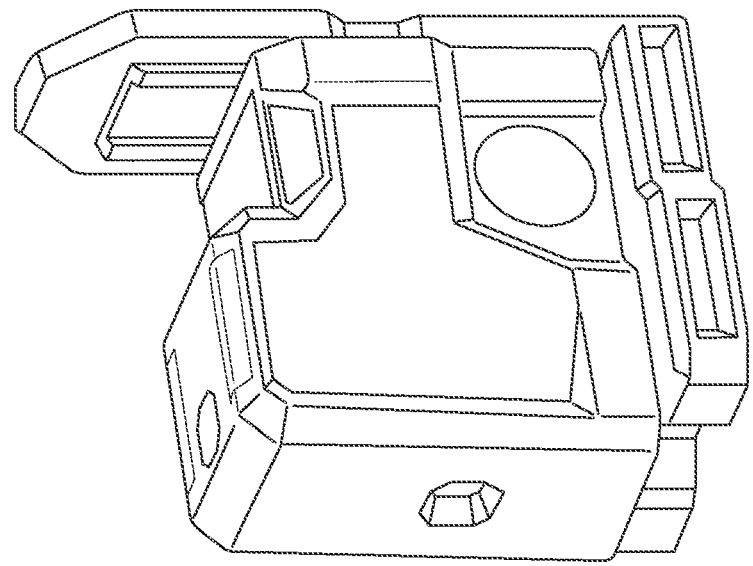
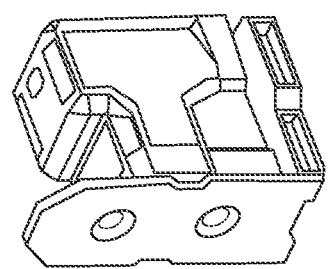
FIG. 13
FIG. 12
FIG. 11

LASER PROJECTION TOOLS AND MOUNTING ACCESSORIES

CROSS-REFERENCE TO RELATED PATENT APPLICATION

The present application is a continuation of International Application No. PCT/US2020/013877, filed on Jan. 16, 2020, which claims the benefit of and priority to U.S. Provisional Application No. 62/793,151, filed on Jan. 16, 2019, and U.S. Provisional Application No. 62/872,091, filed on Jul. 9, 2019, each of which are incorporated herein by reference in their entireties.

BACKGROUND OF THE INVENTION

The present invention relates generally to the field of tools. The present invention relates specifically to a laser projection tool, such as a point laser tool, a line laser tool, etc., that projects a laser onto a workpiece.

SUMMARY OF THE INVENTION

One embodiment of the invention relates to a laser projection device with a compact frame that provides for rotational and translational positioning of a laser device housing relative to the frame. The frame accounts for a small portion of the total dimensions, such as less than 25% of the height, length and/or width of the device.

In one embodiment, a frame for a laser projection device includes a first plurality of magnets arranged around an axis, and a central projection centered on the axis. The laser projection device projects one or more lasers that indicate an orientation of the laser projection device. The first plurality of magnets interface with a magnet interface coupled to the laser projection device. The central projection interfaces with a central recess defined by a second frame coupled to the laser projection device. The first plurality of magnets interact with the magnet interface of the laser projection device to couple the laser projection device in a set of positions. The laser projection device can be repositioned at fixed intervals with respect to the frame to reposition the frame relative to the laser projection device from a first position of the set of positions to a second position of the set of positions.

In another embodiment, a frame for a laser projection device includes a first leg, a second leg, a first channel defined by an outer surface of the first leg, a second channel defined by an outer surface of the second leg, a first magnet within the first channel, and a second magnet within the second channel. The laser projection device indicates an orientation of the laser projection device, such as by projecting one or more lasers. The first outer surface and the second outer surface both face away from the laser projection device when coupled to the frame. The first channel defines and extends along a first axis, and the second channel defines and extends along a second axis, which is not co-axial with the first axis.

In another embodiment, a laser projection device includes a housing, a first light emitting device supported by the housing, an inner frame coupled to the housing, a first adjustment mechanism and a second adjustment mechanism. The first laser light emitting device is supported by the housing. The first laser light emitting device projects a first laser in a first direction from the housing, with the first laser indicating an orientation of the housing with respect to gravity. The first light emitting device also projects a second laser in a second direction from the housing, with the second direction being perpendicular to the first direction. When actuated, the first adjustment mechanism adjusts the first direction of the first laser and the second direction of the second laser. When actuated, the second adjustment mechanism adjusts the first direction of the first laser but does not adjust the second direction of the second laser.

In various embodiments, the laser projection device is moveable from use position to a storage position. In such embodiments, the laser device housing is rotatable relative to a frame such that one or more laser openings are covered and/or protected by the frame.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIGS. 3A-3C show various perspective views of the laser mechanism housing of the laser projection tool of FIG. 1, according to an exemplary embodiment.

FIGS. 7-10 show a laser projection tool with a frame, according to another exemplary embodiment.

FIGS. 11-13 show a laser projection tool with a frame, according to another exemplary embodiment.

DETAILED DESCRIPTION

Referring generally to the figures, various embodiments of a laser projection tool with mounting frame, such as a point laser tool or a line laser tool, are shown. In general, the laser projection tool discussed herein includes a compact frame that couples to and supports the laser device housing. In specific embodiments discussed herein, the compact frame is configured to provide fine laser position adjustment controls and/or mounting hardware that is compact and low profile and that is designed to be maintained in engagement with the laser projection tool during use and storage. The mounting hardware supported by the frame discussed herein assists the user in mounting the laser device at a specific height, aligned with a structure, or otherwise oriented for the particular use. In addition, the compact frame provides for protection of the laser opening and lens when the laser device housing is moved to a storage position relative to the compact frame.

In contrast to the laser projection device discussed herein, conventional mounting accessories are bulky, cumbersome, and are easily lost. Many users do not even use the conventional mounting accessories because of the likelihood that the accessories will be lost or left behind on a job site. Further, storage of the typical laser projection device involves storage in a bulky storage container or box specifically for the laser projection device. The laser projection device and compact frame discussed herein provides a design that addresses these deficiencies of conventional devices while still providing fine adjustment and mounting functionality, along with the compact size discussed herein.

Figure 1:
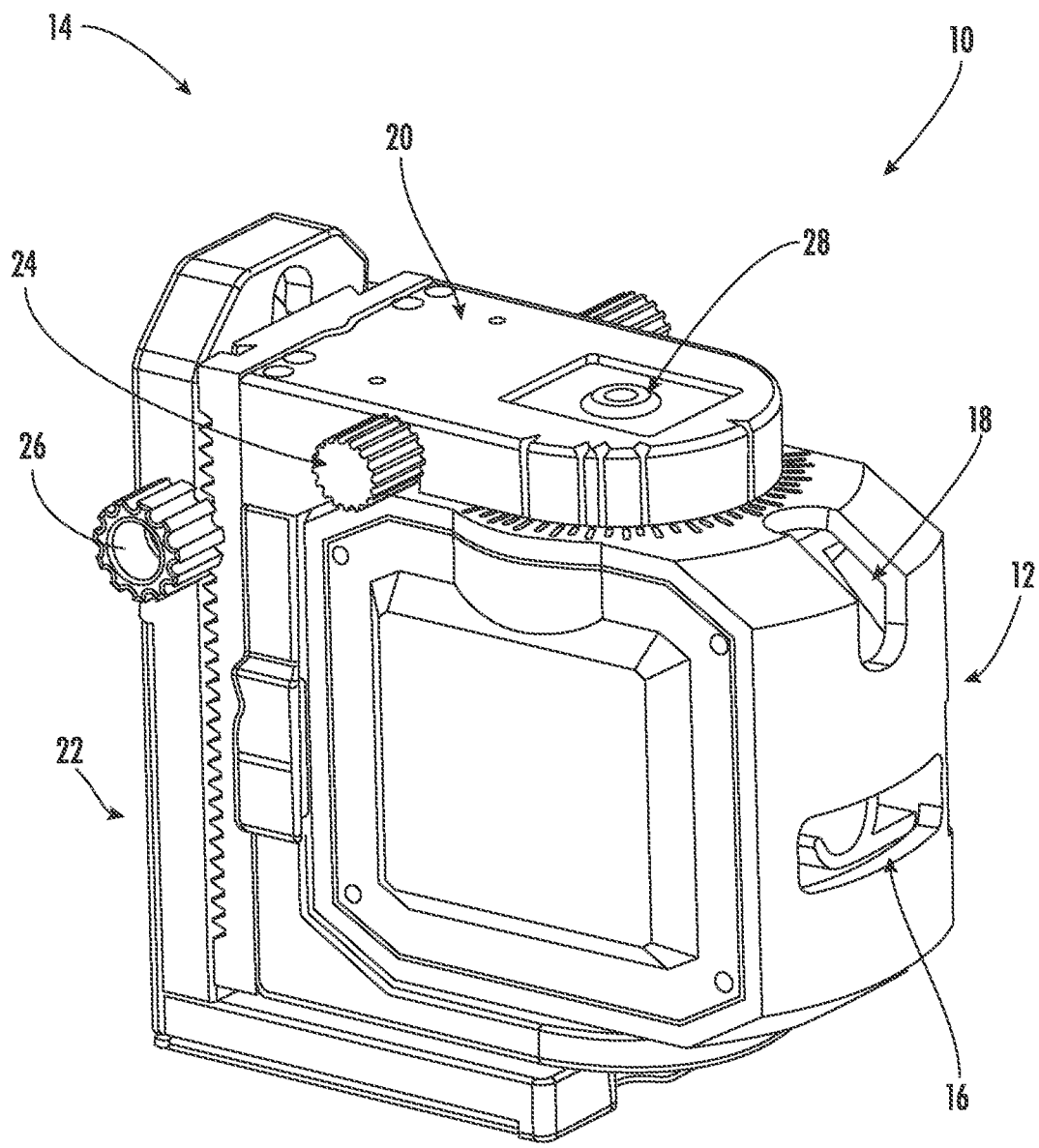
FIG. 1 is a perspective view of a laser projection tool with a frame, according to an exemplary embodiment.

Referring to FIG. 1, a laser projection device 10 is shown according to an exemplary embodiment. Laser projection device 10 includes a laser device housing 12 and a frame 14. Laser device housing 12 includes various electronic components, laser light sources and optics associated with a laser projection tool, and includes one or more laser projection openings, shown as laser openings 16 and 18, through which the internal laser light sources project laser lines, points, etc. onto a workpiece or work surface.

Typically, laser device housing 12 may house any of a variety of laser project devices. In specific embodiments, laser device housing 12 supports a point laser device that projects one or more dots of laser light onto a work surface or workpiece. For example, the point laser device may be a 5-dot laser system which projects three dots in a horizontal plane, each dot 90° from the adjacent dot in the horizontal plane, as well as a dot straight above and straight below the device. In other embodiments, the point laser device may project fewer points in any combination of the 5-dot laser system. In other embodiments, laser device housing 12 supports a line laser device that projects a line on a work surface. For example, the line laser device may be a 2-plane line laser device that projects a horizontal line (e.g., 180° of a plane) and a vertical line (e.g., 180° or more) that intersect with each other. In specific embodiments, the laser device supported within laser device housing 12 includes a self-leveling mechanism that levels the laser output even if the housing of the laser system is not level.

Frame 14 includes a C frame portion 20 and an L frame portion 22. C frame portion 20 supports a rotational adjustment knob 24 that controls rotation of laser device housing about an axis of rotation 28. L frame portion 22 includes a translation adjustment knob 26. As will be discussed in more detail below, translation adjustment knob 26 controls translational positioning of C frame portion 20 along L frame portion 22 which allows the user to provide fine adjustment to height of laser device housing 12.

FIG. 1 shows laser projection device 10 in the open or use position. Frame 14 provides for storage and protection of laser device housing 12 without the need for separate storage components, containers or cases. To move laser projection device 10 to the storage position, laser device housing 12 is rotated 180 degrees from the position shown in FIG. 1. In this position, laser openings 16 and 18 are surrounded by frame 14. In this position, laser openings 16 and 18 face the inner surfaces of frame 14, and frame 14 covers and protects laser openings 16 and 18.

As shown in FIG. 1, frame 14 is configured and sized to provide the various adjustment, mounting and storage functionality discussed herein, while also providing a compact size and shape. For example, in various embodiments, the frame 14 increases the maximum height dimension of device 10 (above and beyond the height of device housing 12), by less than 25%, specifically less than 20% and more specifically less than 10%; in various embodiments, less than 25%, specifically less than 20% and more specifically less than 10% of the maximum length dimension of device 10 is provided by frame 14; and/or, in various embodiments, less than 25%, specifically less than 20% and more specifically less than 10% of the maximum width dimension of device 10 is provided by frame 14.

Figure 2:
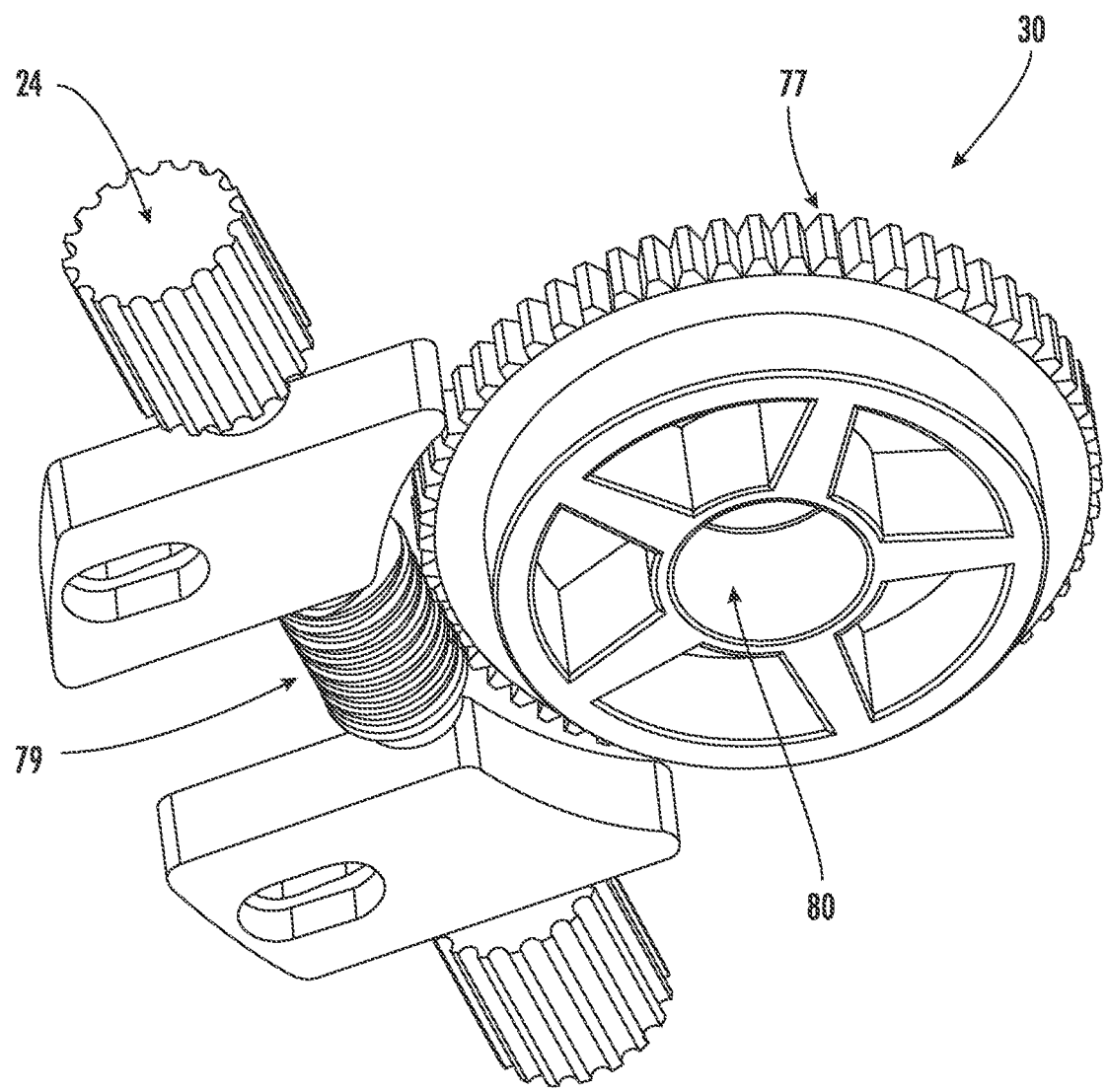
FIG. 2 is a perspective view of a fine rotational adjustment mechanism of the laser projection tool of FIG. 1, according to an exemplary embodiment.

FIG. 2 shows the rotational adjustment mechanism, shown as rotational mechanism 30, that is supported by frame 14 and that is controlled by rotational adjustment knob 24. In the specific embodiment shown, Applicant has found that the ring gear 77/worm gear 79 arrangement shown in FIG. 2 provides for rotational adjustment while allowing for the compactness discussed herein. In addition, Applicant has determined that the ring gear/worm gear arrangement shown in FIG. 2 provides a higher gear ratio (e.g., as compared to a spur gear arrangement), which in turn allows the user to more easily aim the laser in smaller movement increments. Friction within the ring gear/worm gear system permits the laser mechanism to remain stationary unless the arrangement is being directly actuated by a user. Receiver 80 receives, for example, an upper shaft of a laser mechanism housing.

FIGS. 3A-3C show perspective views of laser device housing 12. As shown in FIG. 3C, laser device housing 12 includes a locking mechanism, shown as slide lock 40, which engages with an opening in C frame portion 20 to maintain laser device housing in the storage position as discussed above. Upper shaft 83 rotates about axis 81, until the housing is aligned correctly as indicated by angle measurement markings 84 and then subsequently locked via slide lock 40. Lasers are emitted via laser openings 85, 86, and 87.

Figure 4A:
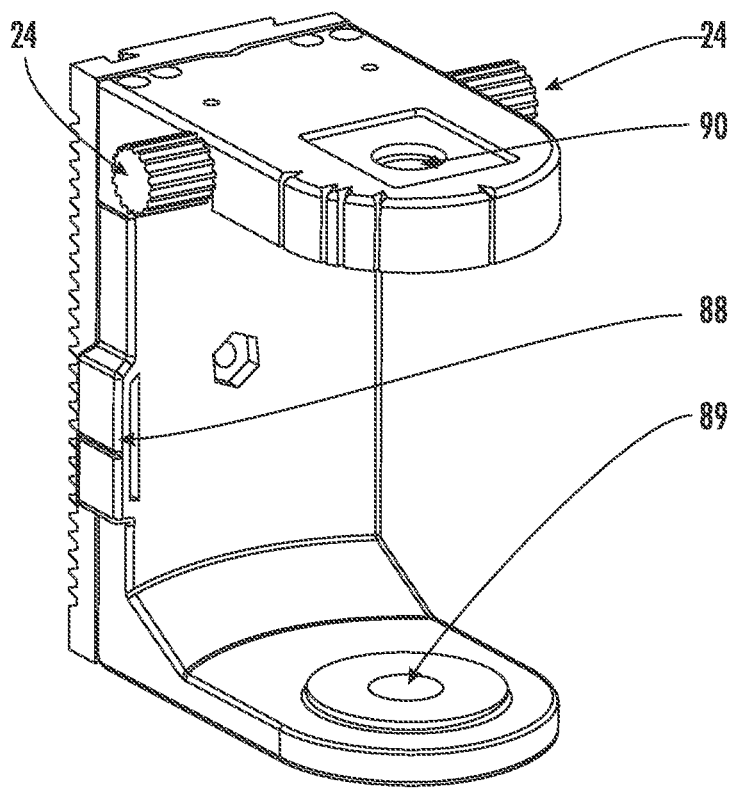
FIGS. 4A and 4B show perspective views of a C-frame portion of the frame of the laser projection tool of FIG. 1, according to an exemplary embodiment.
Figure 4B:
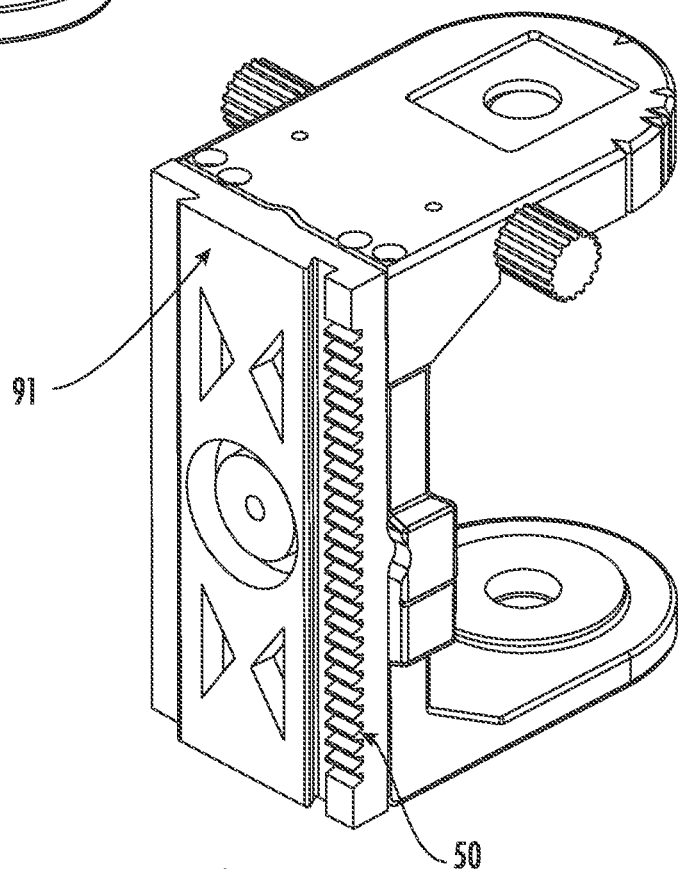

FIGS. 4A and 4B show perspective views of C frame 20. In general, C frame 20 includes one or more features that Applicant believes provides the compactness and functionality of frame 14 discussed herein. Further, C frame 20 includes rack gear 50 located along its rear surface. Rack gear 50 interfaces with cooperating gearing controlled by translational adjustment knob 26 supported by L frame 22 to provide translational position adjustment to laser device housing 12. In a specific embodiment, pass through-90 interfaces with an upper shaft of the laser mechanism housing, a laser is emitted through opening 89, and slide-lock engagement 88 permits the user to actuate a locking mechanism. Dove tail rail 91 interfaces with a corresponding recess to permit C frame 20 to be adjusted.

Figure 5A:
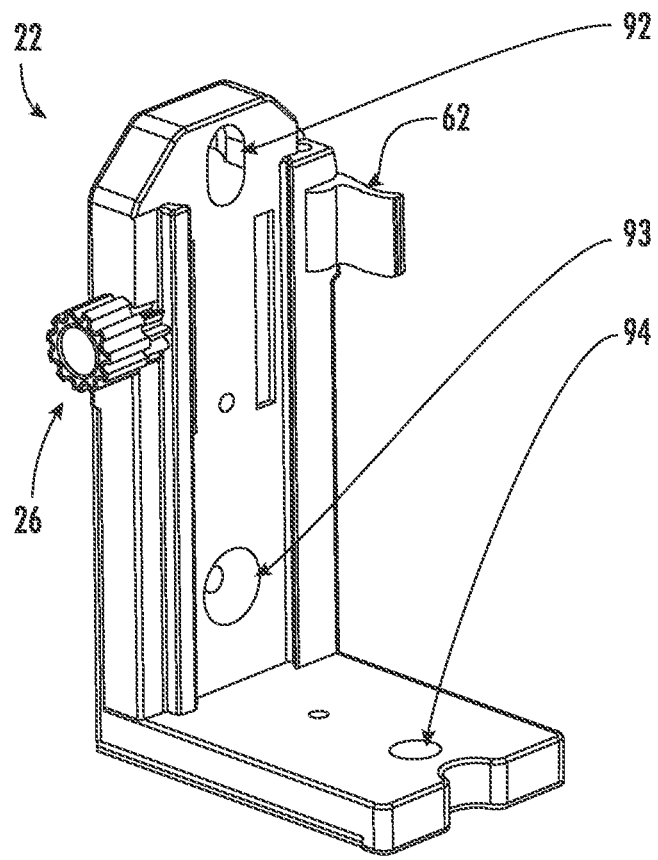
FIGS. 5A and 5B show perspective views of an L-frame portion of the frame of the laser projection tool of FIG. 1, according to an exemplary embodiment.
Figure 5B:
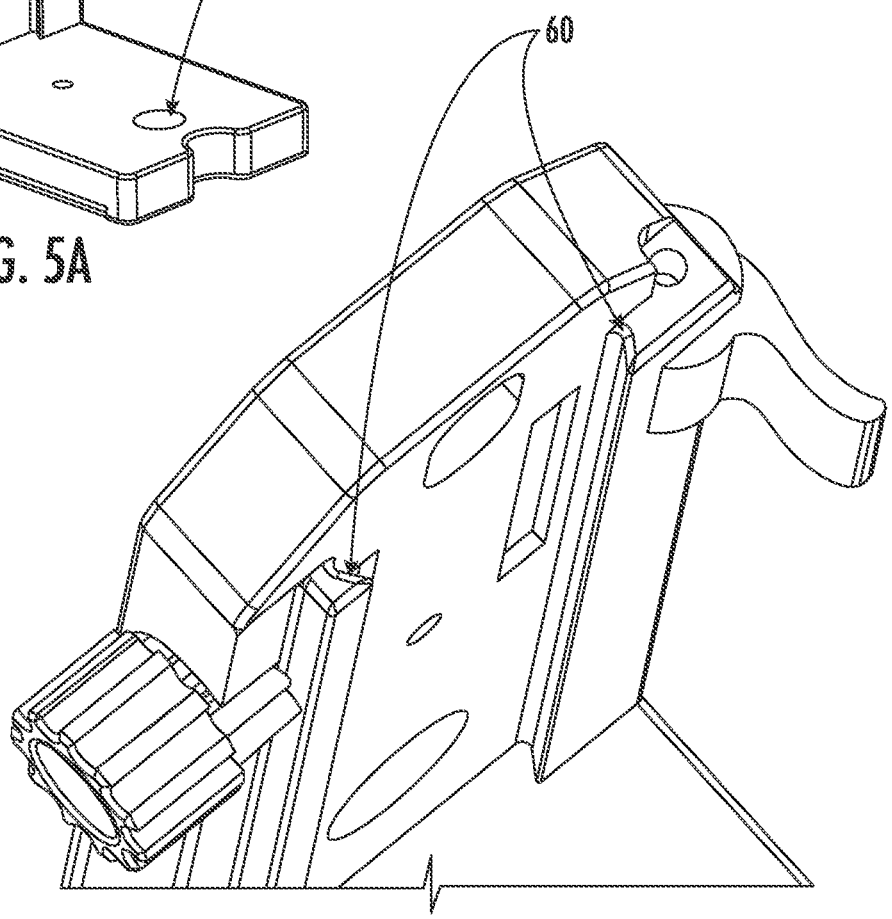

FIGS. 5A and 5B show perspective views of L frame 22. In general, L frame 22 includes one or more features that Applicant believes provides the compactness and functionality of frame 14 discussed herein. In various embodiments, L frame 22 includes dovetail receivers 60 that engage a corresponding dovetail rail of C frame 20. The engagement between dovetail receivers 60 and the dovetail rail of C frame 20 provides flush and low profile coupling between the frame portions of frame 14 that contributes to the overall compactness of frame 14. Further, L frame 22 supports a height locking mechanism, shown as cam lock 62. Cam lock 62 engages C frame 20 to maintain the relative position between frame portions 20 and 22 once set via knob 26. In a specific embodiment, screw head slot 92 and screw hole 93 permit L frame 22 to be coupled, such as via a screw, to various objects, such as a wall, stud, etc. Cut-out 94 permits laser to be emitted through the opening defined by cut-out 94. Friction between the various frames, such as an L frame and a C frame, is sufficient to keep their positions stationary with respect to each other except when the frames' positions are being adjusted with respect to each other. In one embodiment, the C frame includes a rack gear on both sides, thereby allowing the L-frame to engage the C frame in an inverted position.

Figure 6:
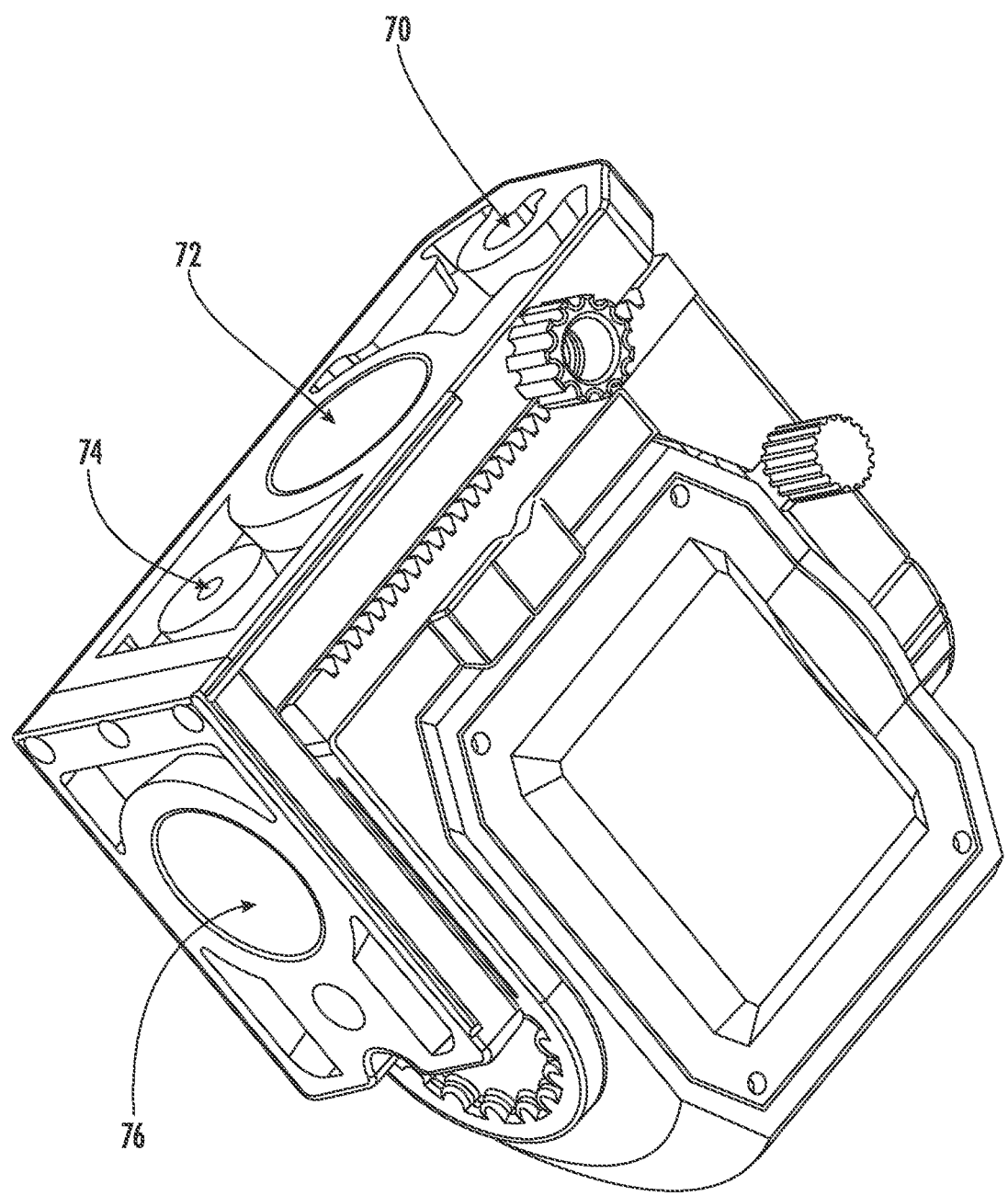
FIG. 6 shows a rear perspective view of the laser projection tool of FIG. 1 illustrating details of attachment or mounting components of the frame, according to an exemplary embodiment
Figure 15:
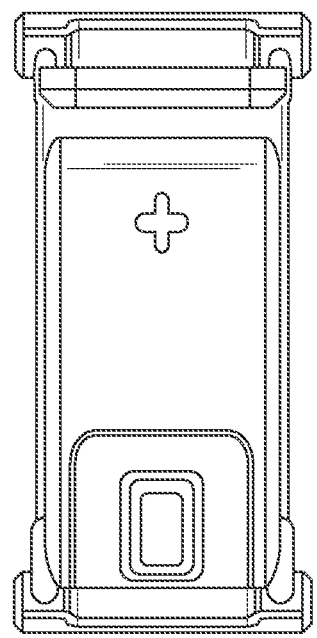
FIGS. 14-17 show a laser projection tool with a frame, according to another exemplary embodiment.
Figure 17:
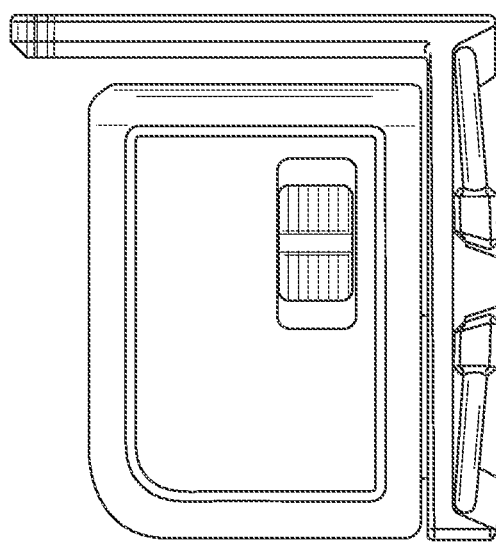
Figure 14:
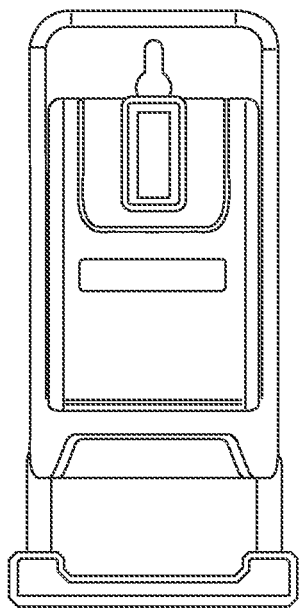
Figure 16:
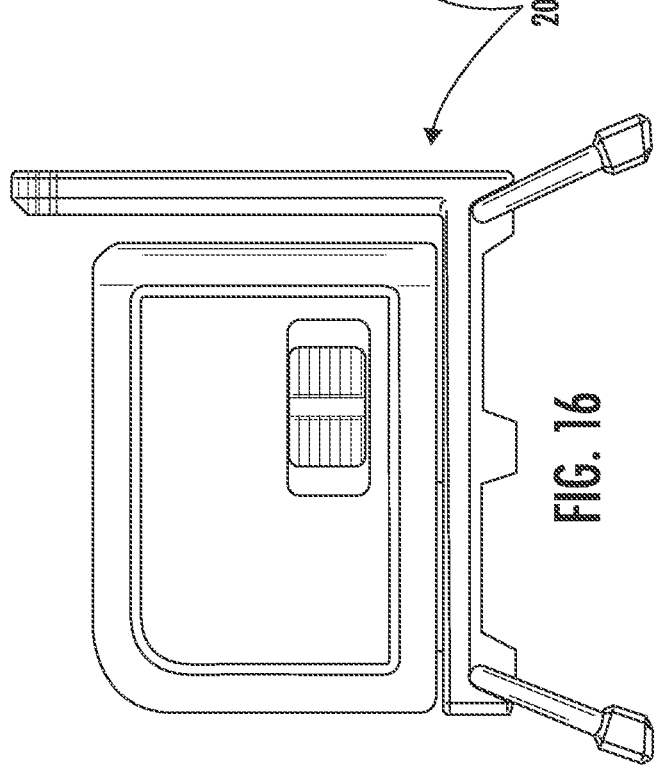

FIG. 6 shows a rear perspective view from below of laser projection device 10. As shown in FIG. 6, frame 14 includes one or more mounting structures that allow the user to mount laser projection device 10 to various structures as needed for a particular application. In the specific embodiment shown, L frame 22 includes one or more screw head receiving slots 70, one or more mounting magnets 72, one or more screw receiving holes 74 and one or more mounting magnets 76. These structures allow the user to mount laser projection device 10 to a wide variety of structures, including metal structures, such as I beams, door frames, wall studs, joists, etc. and the magnets allow for mounting to such components made from metal.

Referring still to FIG. 6, as will be understood, in use, L frame 22 and device 10 may be positioned in a wide variety of orientations relative to a work surface as may be selected by the user. For example, laser projection device 10 can be repositioned 180 degrees from the orientation shown in FIG. 1 such that the portion of L frame 22 that supports magnet 76 is located above laser device housing 12. In this position, laser projection device 10 can be hung from a ceiling grid, a beam, etc., utilizing magnet(s) 76 or other mounting structures, while still allowing for the translation movement between C frame 20 and L frame 22 as discussed herein. Similarly, if laser projection device 10 is repositioned 90 degrees from the orientation shown in FIG. 1 to attach laser projection device 10 to a vertical surface, the translation movement between C frame 20 and L frame 22 discussed herein provides for adjustment of the horizontal positioning of laser device housing 12.

It should be understood that while the embodiments shown in FIGS. 1-6 show C frame 20 and L frame 22 as being detachable from each other. In other embodiments, C frame 20 and L frame 22 are coupled together in a manner which prevents the user from separating the frame components from each other. By retaining C frame 20 and L frame 22 together, the user is less likely to misplace one of the frame components. In some such embodiments, C frame 20 and L frame 22 are coupled together via a pivoting joint allowing C frame 20 to be rotated to different positions relative to L frame 22. In some specific embodiments, detents are located every 90 degrees around the pivot joint allowing C frame 20 to be snapped into place relative to L frame 22 at the position of each of the detents following rotation via the pivot joint.

Referring to FIGS. 7-10, a laser projection device 100 is shown according to an exemplary embodiment. Laser projection device 100 is substantially the same as laser projection device 10 except for the differences discussed herein. Laser project device 100 includes a frame 102 that supports laser device housing 12.

Frame 102 includes an outer L-bracket 104 and an inner L-bracket 106. Inner L-bracket is height adjustable along the vertical leg of outer L-bracket 104 generally as discussed herein. Laser device housing 12 is rotatable about a vertical axis via a pivoting connection to inner L-bracket 106. Frame 102 includes a rotational fine adjustment knob 108 and a height fine adjustment knob 110. Applicant has found that the positioning of knobs 108 and 110 shown in FIG. 9 allows the user to operate the adjustment knobs without having their hand interfere with movement of the laser device housing.

Frame 102 includes a pivoting joint 112 defining a pivoting axis 114 connecting inner L-bracket 106 to outer L-bracket 104. Pivot joint 112 allows outer L-bracket 104 to pivot relative to inner L-bracket 106 to a position in which the horizontal leg of outer L-bracket 104 is located above laser device housing 12.

Referring to FIGS. 11-13, a laser projection device 150 is shown according to an exemplary embodiment. Laser projection device 150 is substantially the same as laser projection device 10 except for the differences discussed herein. Laser projection device 150 includes a frame 152 that supports laser device housing 12.

Frame 152 is an L-shaped bracket. Laser device housing 12 attaches to the L-bracket frame 152 with a dovetail type attachment 154. In other embodiments, attachment 154 may be any similar slot-style attachment mechanism. L-bracket frame 152 includes two magnets located along the vertical leg 156 of frame 152. A first magnet is located in a high position (e.g., spaced away from the horizontal leg of frame 152), and a second magnet is located in a low position (e.g., spaced adjacent to the horizontal leg of frame 152). Laser device housing 12 supports a magnet that is positioned to interact with the magnets of frame 152. When laser device housing 12 is in the low position, the magnet of laser device housing 12 is attracted to the low magnet of frame 152 such that the magnets act together to maintain laser device housing 12 in the low position on frame 152. The user can slide laser device housing 12 along the dove-tail slot formed in vertical leg 156 overcoming the attraction of the housing magnet to the low magnet to position laser device housing 12 in a high position along vertical leg 156. In the high position, the magnet in laser device housing 12 is attracted to the high magnet, and thereby, acts to hold the laser device housing 12 in the high position.

Figure 20:
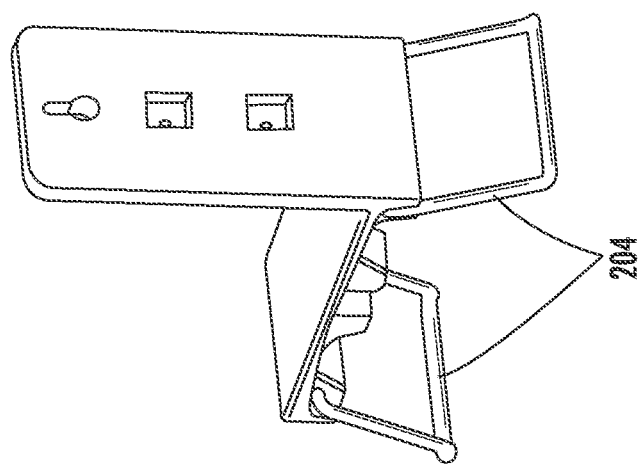
FIGS. 18-20 show detailed views of the frame from the laser projection tool of FIGS. 14-17, according to an exemplary embodiment.
Figure 19:
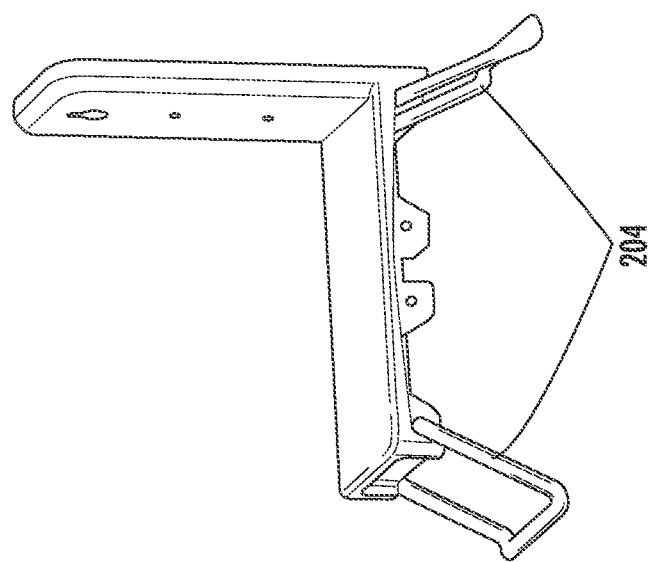
Figure 18:
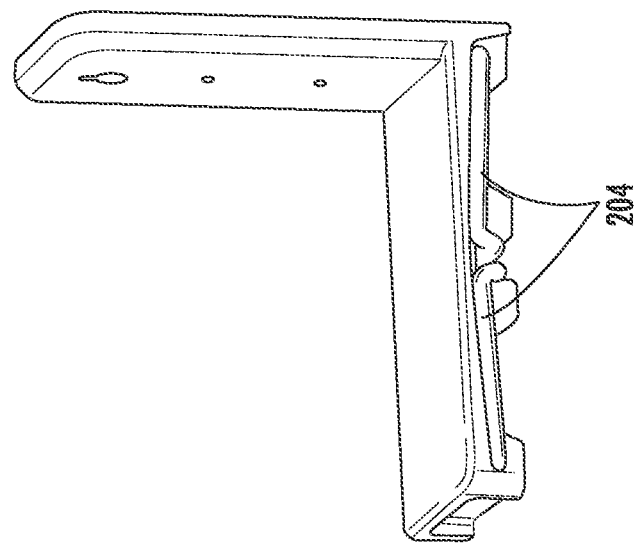

Referring to FIGS. 14-17, a laser projection device 200 is shown according to an exemplary embodiment. Laser projection device 200 is substantially the same as laser projection device 10 except for the differences discussed herein. Laser projection device 200 includes a frame 202 that supports laser device housing 12. FIGS. 18-20 are detailed views of frame 202.

Frame 202 includes a pair of foldable legs 204 located on the horizontal leg of frame 202. As shown in FIG. 18, legs 204 are pivotable to a closed position in which legs 204 are folded along the lower surface of frame 202. As shown in FIGS. 19 and 20, legs 204 are pivotable to an open position in which legs 204 extend from the lower surface of frame 202. Moving legs between the folded and extended position, allows the user to adjust the height of laser device housing 12.

FIGS. 21-24 show an adjustable frame for a laser projection tool positioned in a variety of positions according to an exemplary embodiment. In one embodiment, the frame shown in FIGS. 21-24 is frame 102 shown positioned in a variety of different positions.

Figure 25:
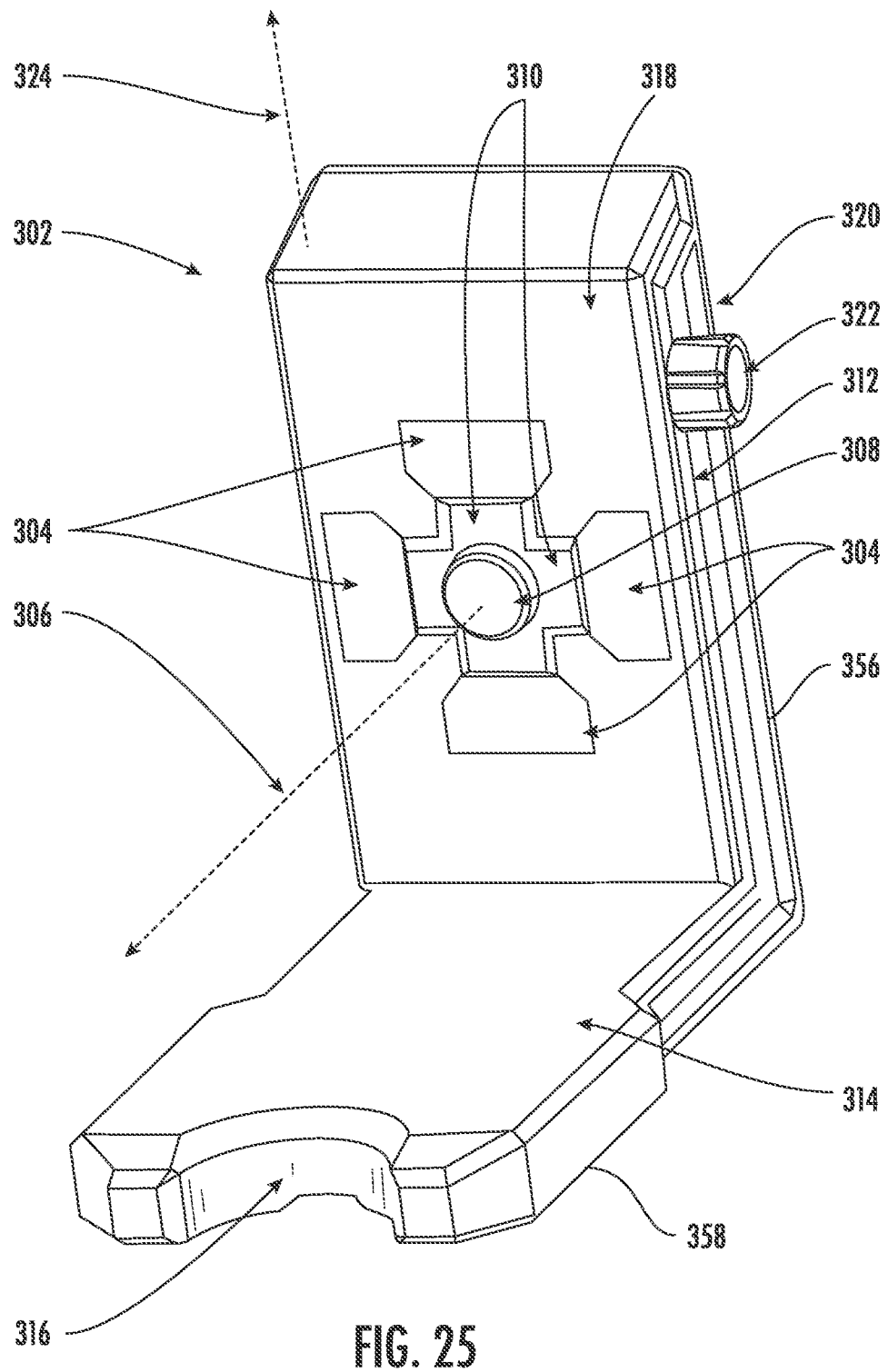
FIGS. 25-27 show an adjustable frame for a laser projection tool positioned in a variety of positions, according to an exemplary embodiment.
Figure 26:
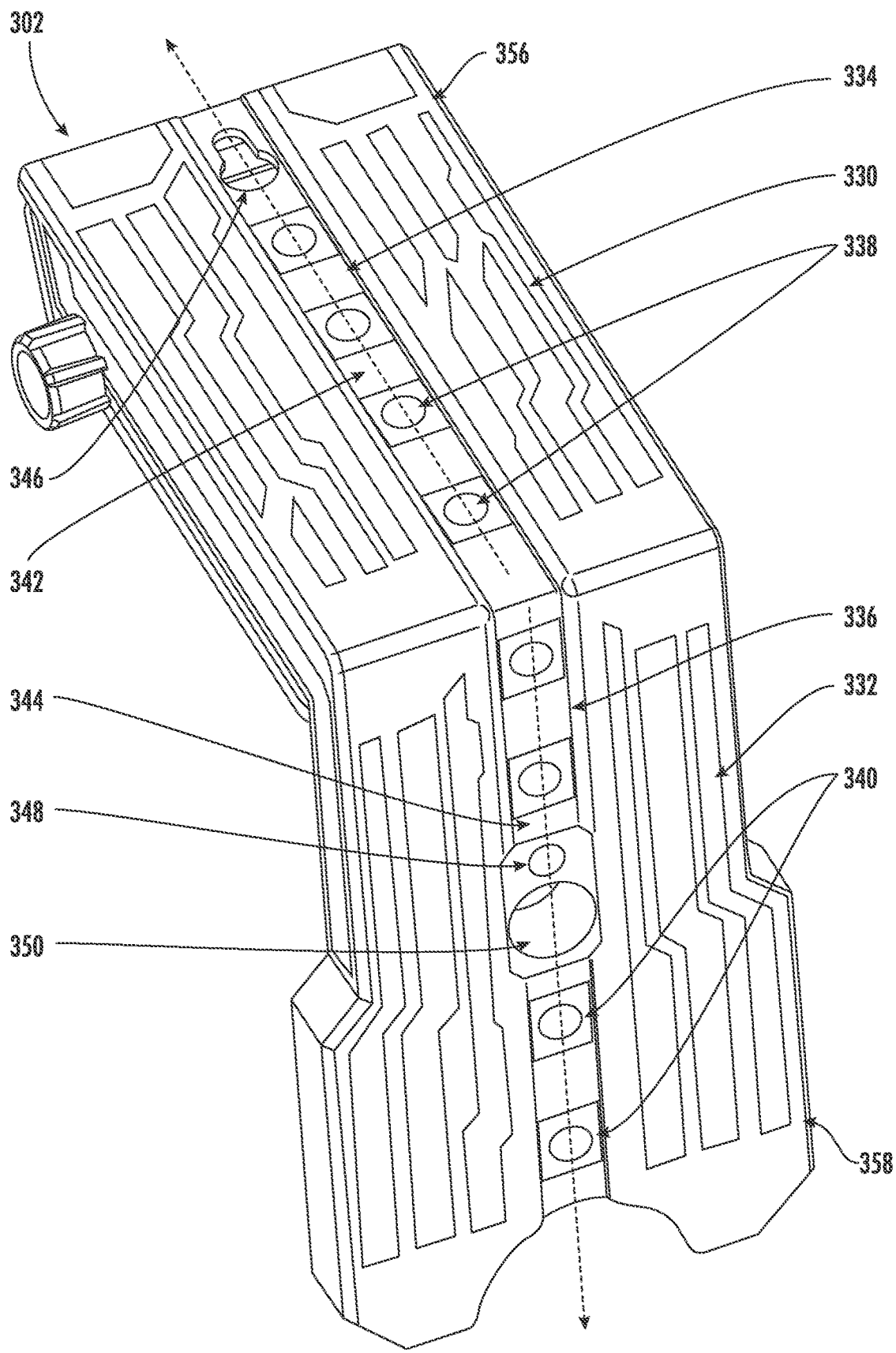
Figure 27:
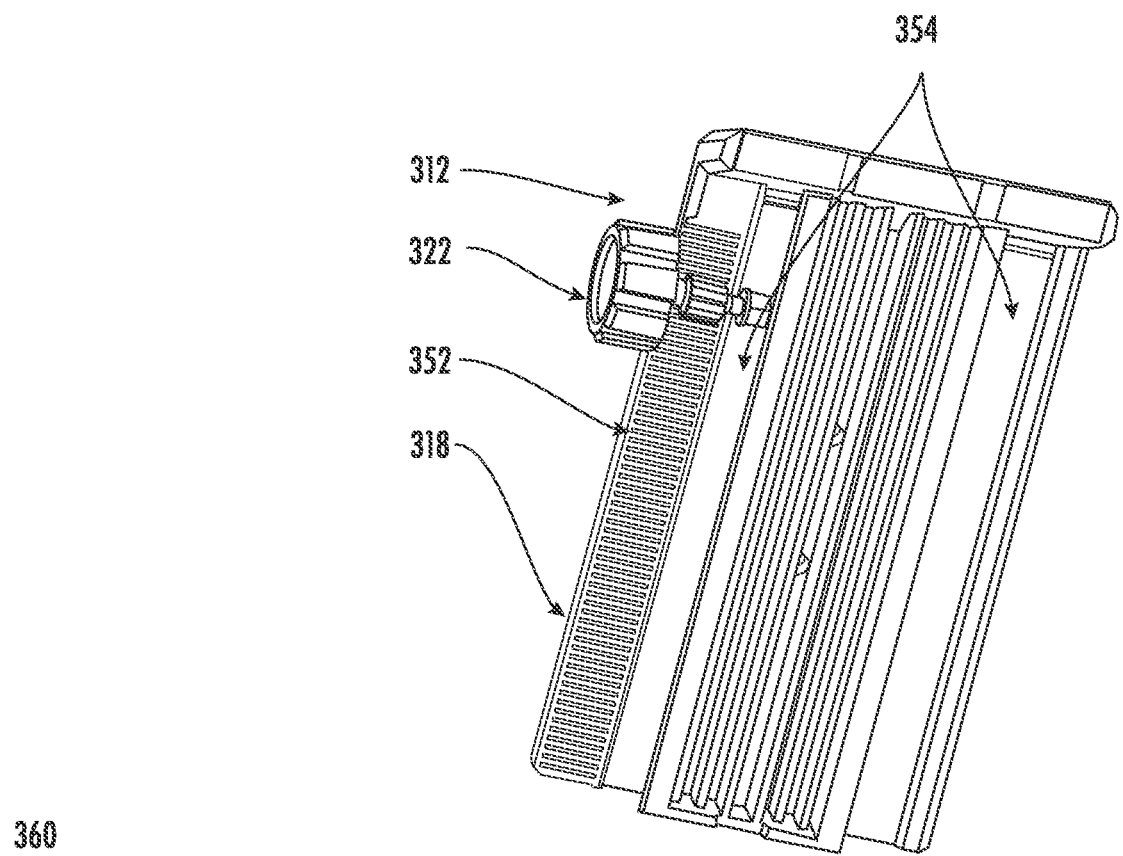

FIGS. 25-27 show mounting device to couple to a laser projection tool, shown as a frame or mount, shown as frame 302. Frame 302 includes horizontal wall 314 and vertical wall 312. In a specific embodiment vertical wall 312 is perpendicular with respect to horizontal wall 314. As shown, vertical wall 312 includes inner wall 318 and outer wall 320. The height of inner wall 318 with respect to horizontal wall 314 can be adjusted along axis 324 via adjustment mechanism 322.

Inner wall 318 can be coupled to various embodiments of laser projections tools, such as those described in this disclosure. Central projection 308 and radial projections 310 project inwardly from inner wall 318 away from outer wall 320. In a specific embodiment central projection 308 is cylindrically shaped and radial projections 310 are arranged symmetrically around axis 306 in 90 degree intervals. Stated another way, from the perspective of axis 306 radial projections 310 comprise four quadrants that are each 90 arcuate degrees and that are identical with each other. In various embodiments magnets 304 are arranged symmetrically around axis 306, and in a specific embodiment magnets 304 are similarly arranged such that magnets 304 comprise four quadrants from the perspective of axis 306 that are each 90 arcuate degrees.

Figure 21:
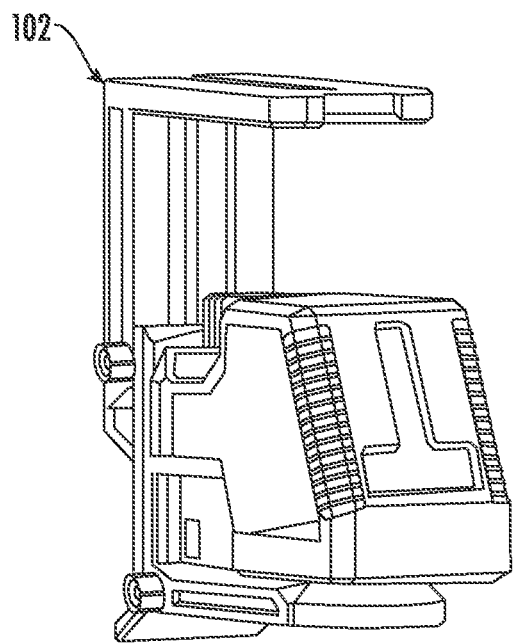
FIGS. 21-24 show an adjustable frame for a laser projection tool positioned in a variety of positions according to an exemplary embodiment.
Figure 22:
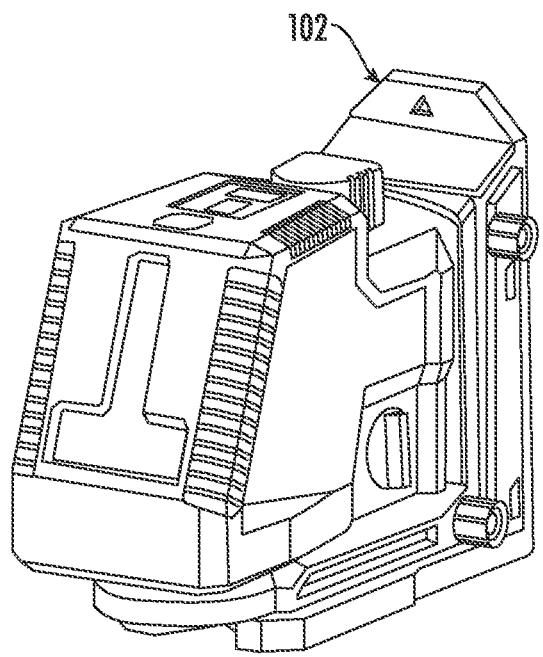
Figure 23:
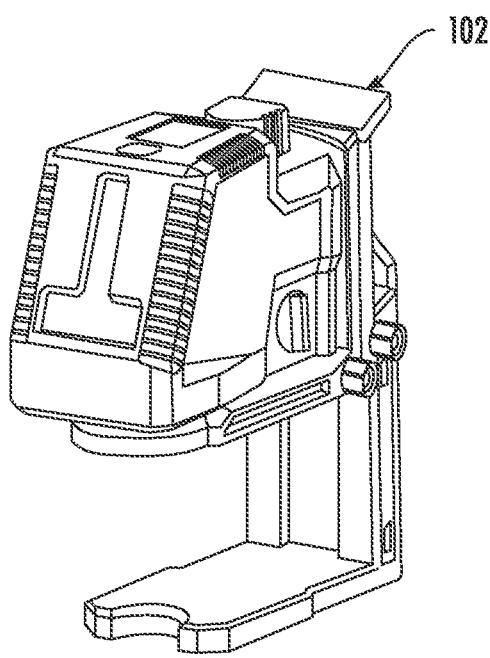
Figure 24:
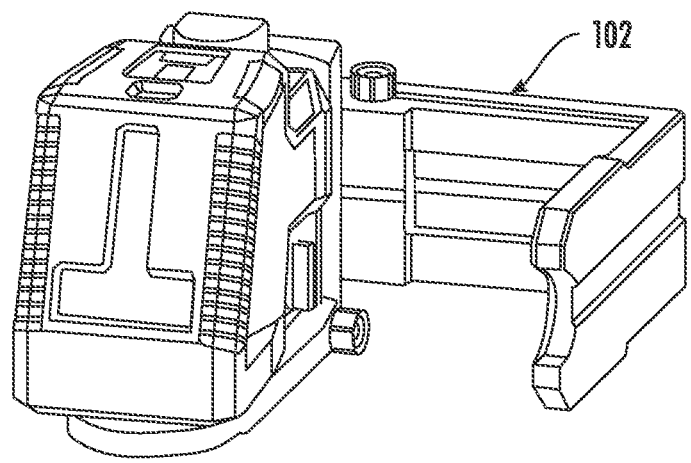
Figure 38:
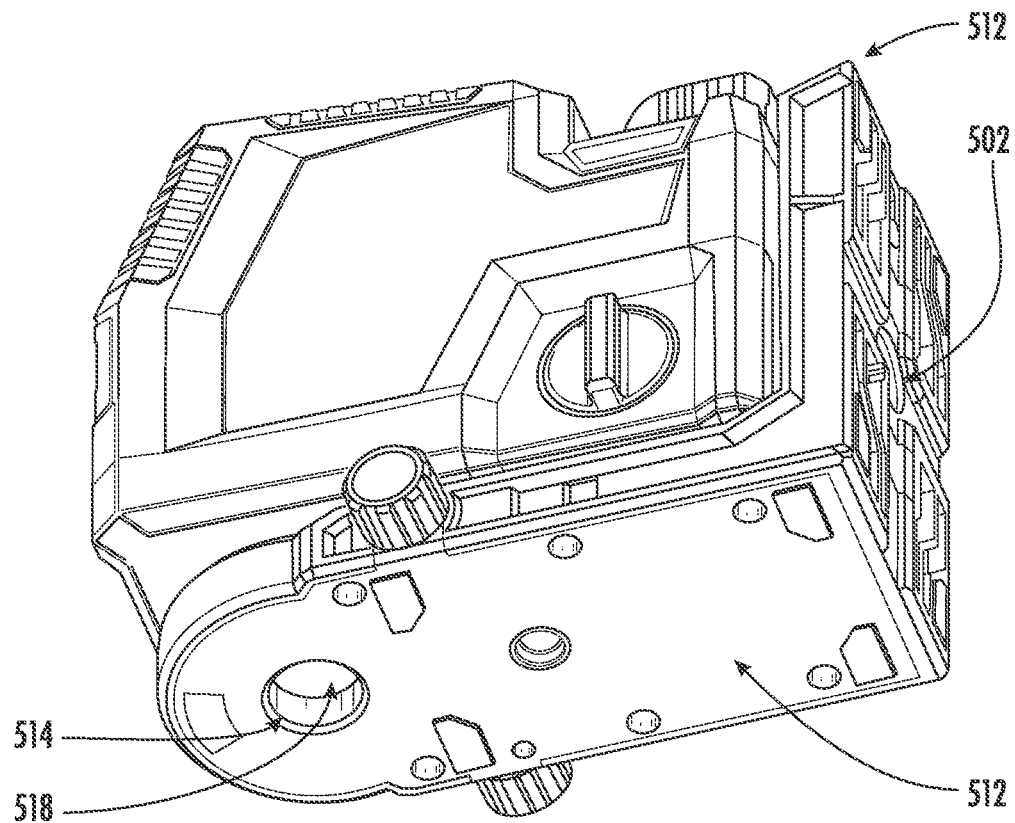
Figure 39:
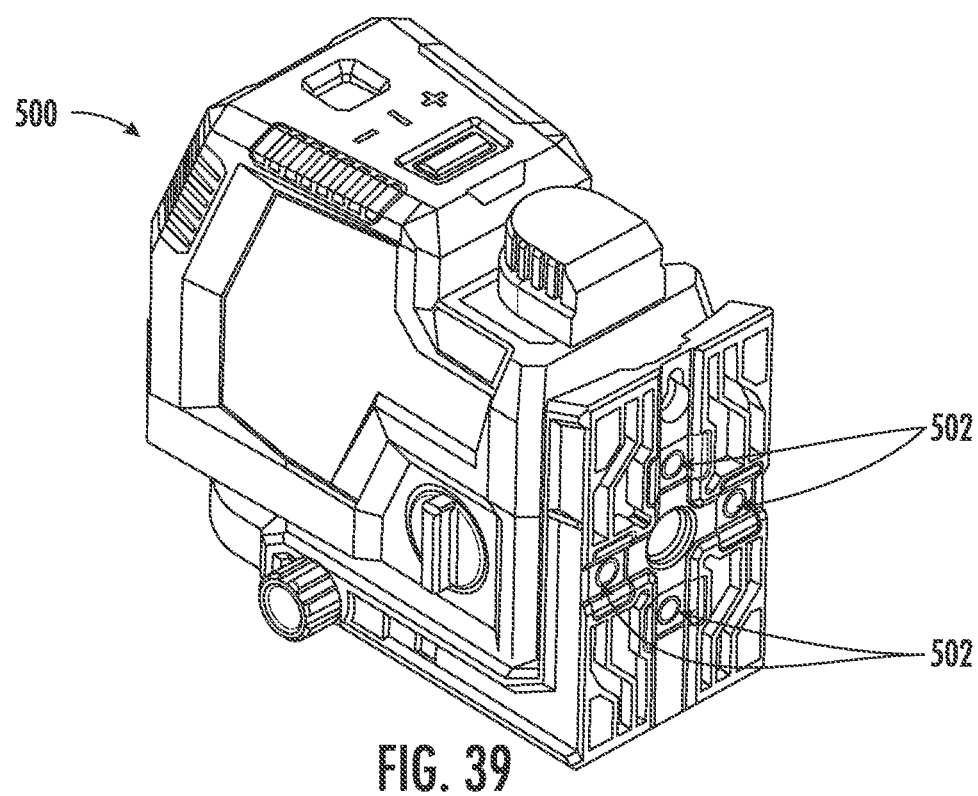
Figure 40:
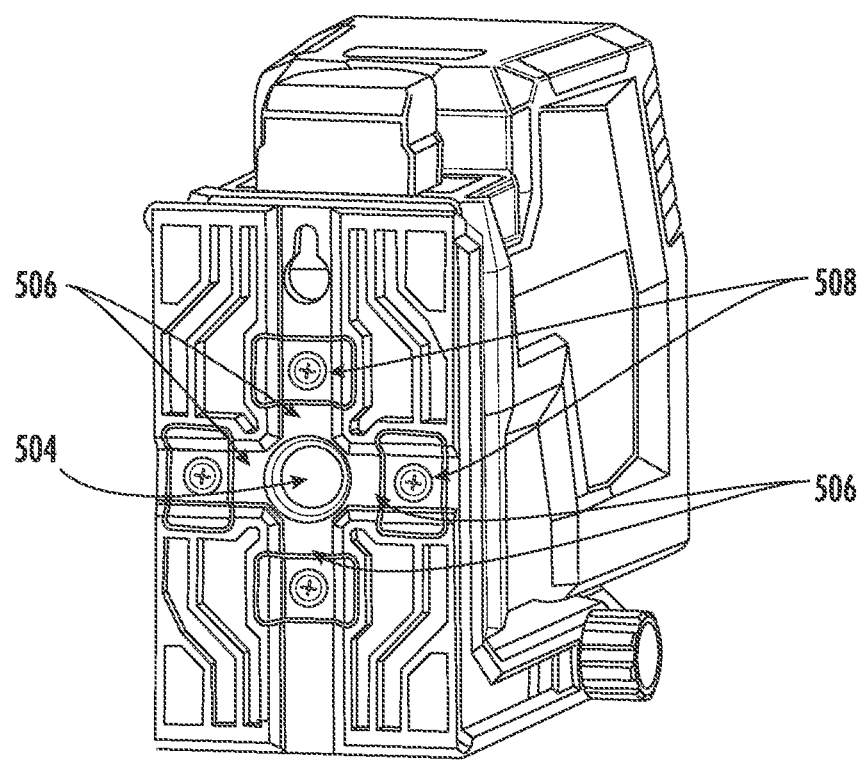

The arrangement of central projections 308, radial projections 310, and magnets 304 permit a plurality of positions for level projection device to be coupled to frame 302. In a specific embodiment, frame 302 is coupled to a laser projection device that has a mounting configuration as shown in FIGS. 38-40. In a first position, such as shown in FIG. 22, a level projection device is coupled to a frame or mount, shown as frame 102, such that the top of the level projection device is positioned furthest away from horizontal wall 314 and facing away from horizontal wall 314. In a second position, such as shown in FIG. 24, the level projection device is decoupled from the frame or mount, repositioned at a fixed intervals, such as at 90 degree intervals, with respect to the frame or mount, and recoupled to the frame or mount. In a third position, such as shown in FIG. 21, the level projection device is decoupled from the frame or mount, repositioned 90 degrees with respect to the frame or mount, and recoupled to the frame or mount such that the top of level projection device is facing towards horizontal wall 314. In a fourth position, the orientation of the level projection device is repositioned yet another 90 degrees.

Horizontal wall 314 defines arcuate cutout 316. In a specific embodiment arcuate cutout 316 is in the shape of a partial circle and defines 135 arcuate degrees of curvature. Cutout 316 permits various laser projection devices to project a light through cutout 316 to a lower surface, such as the ground (e.g., as shown in FIG. 22).

Turning to FIG. 26 in particular, frame 302 includes first leg 356, which defines first outer surface 330, and second leg 358, which defines second outer surface 332. In a specific embodiment first outer surface 330 is perpendicular to second outer surface 332. First channel 334 in first outer surface 330 defines axis 342, second channel 336 in second outer surface 332 defines axis 344, and in a specific embodiment axis 342 and axis 344 are perpendicular.

One or more magnets 338 are coupled to frame 302 and arranged within first channel 334. First channel 334 facilitates positioning frame 302 against a cylindrical object, such as a metal pipe, while one or more magnets 338 within first channel 334 facilitate frame 302 magnetically coupling to the metal object, such as a pipe. Coupling aperture 346 also facilitates coupling frame 302 to an object, such as to a nail protruding from the wall.

Similarly, one or more magnets 340 are coupled to frame 302 and arranged within second channel 336. Second channel 336 facilitates positioning frame 302 against a cylindrical object, such as a metal pipe, while one or more magnets 340 within second channel 336 facilitate frame 302 magnetically coupling to the metal object, such as a pipe. Coupling apertures 348 and 350 also facilitate coupling frame 302 to an object, such as to a nail protruding from the wall and/or a threaded screw. In a specific embodiment apertures 348 and/or 350 are threaded to permit a secure coupling to a correspondingly threaded screw.

Turning to FIG. 27 in particular, height adjustment mechanism 322 actuates the height of inner wall 318 so that inner wall 318 is extended and retracted with respect to horizontal wall 314. Height adjustment mechanism 322 interfaces against worm gear 352 to adjust the position of inner wall 318. For example, inner wall 318 can be retracted such that inner wall 318 is positioned near and/or against horizontal wall 314, similar to what is depicted in FIG. 22, and inner wall 318 can be extended away from horizontal wall 314 such that inner wall 318 is fully extended, similar to shown in FIGS. 21 and 23.

Figure 28:
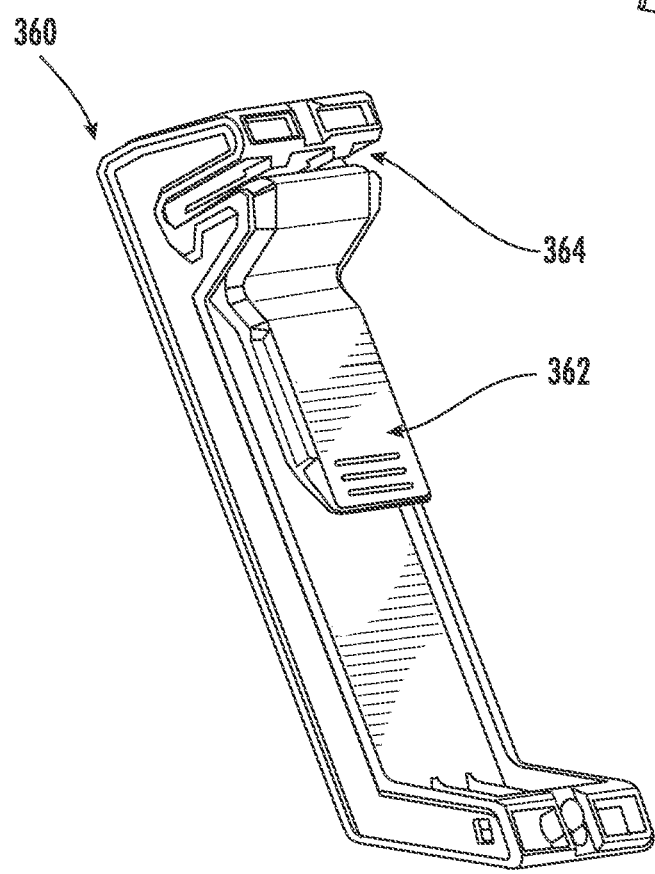
FIGS. 28-29 show a clip for a laser projection tool, according to an exemplary embodiment.
Figure 29:
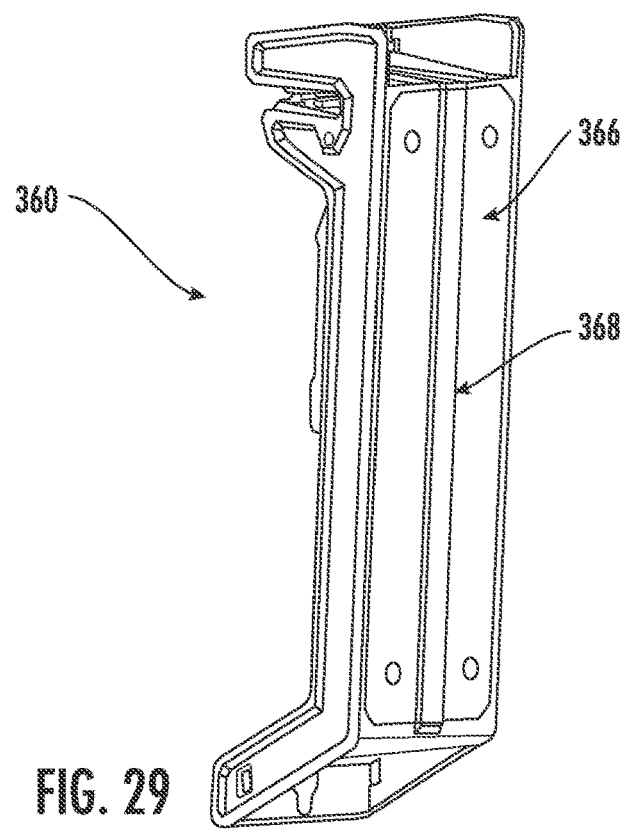
Figure 30:
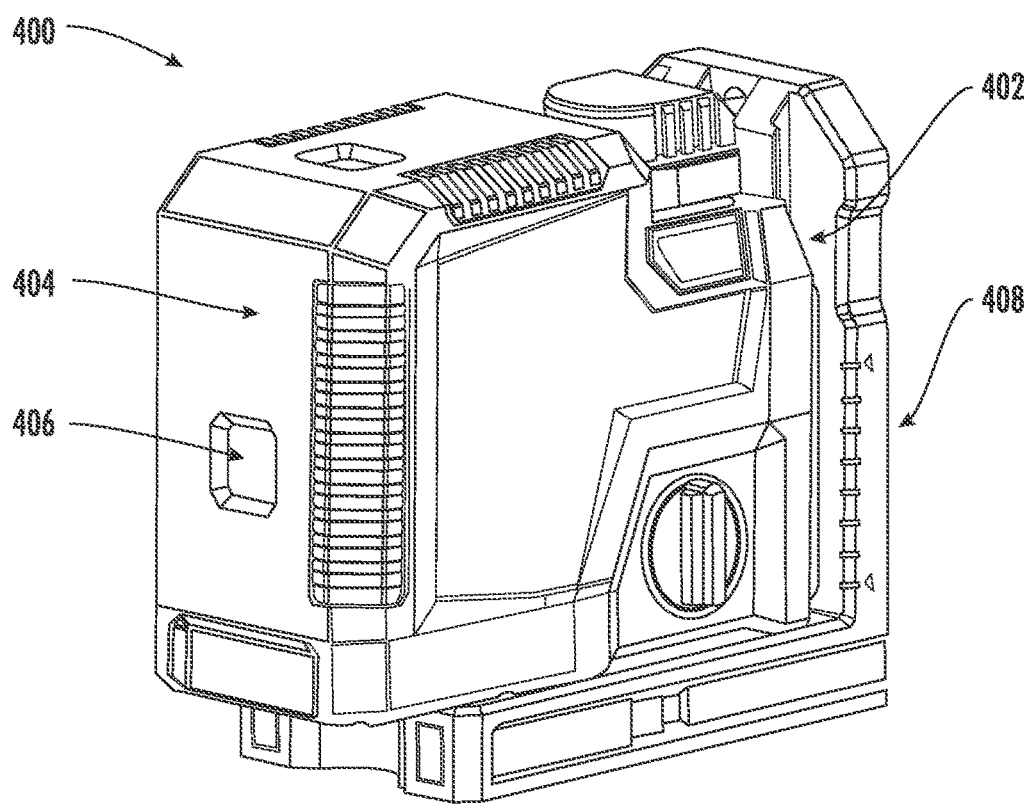
FIGS. 30-36 show a laser projection tool, according to an exemplary embodiment.
Figure 31:
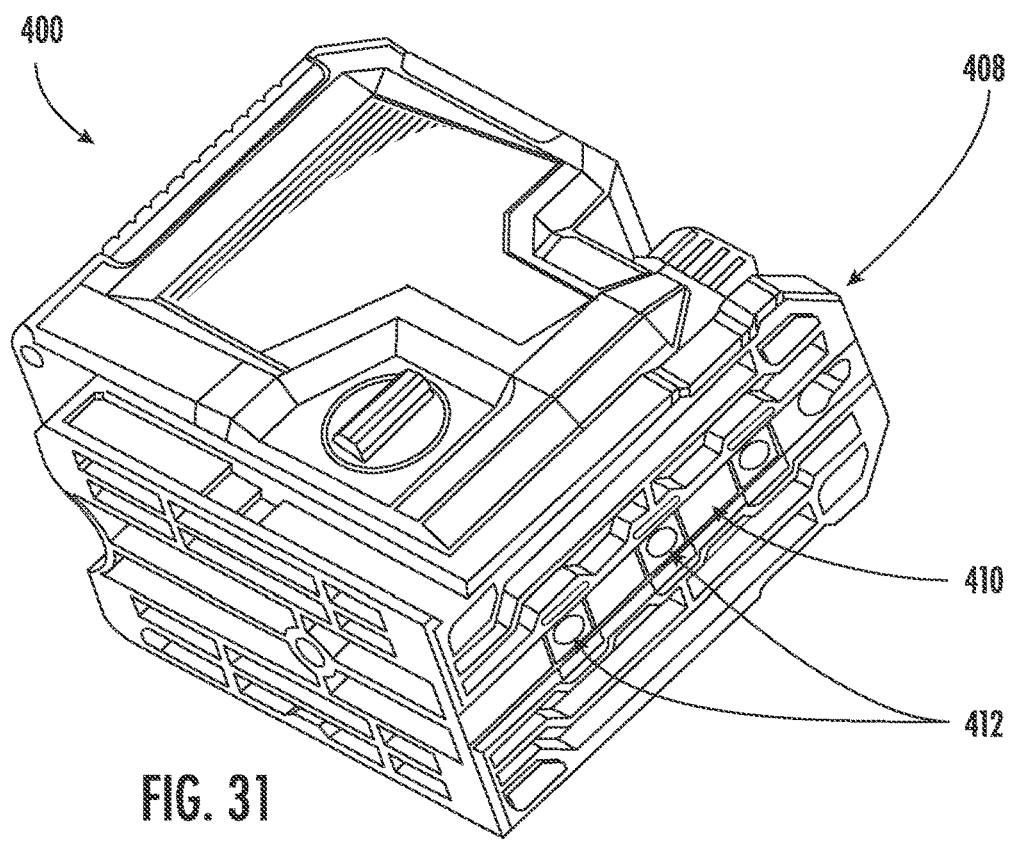
Figure 32:
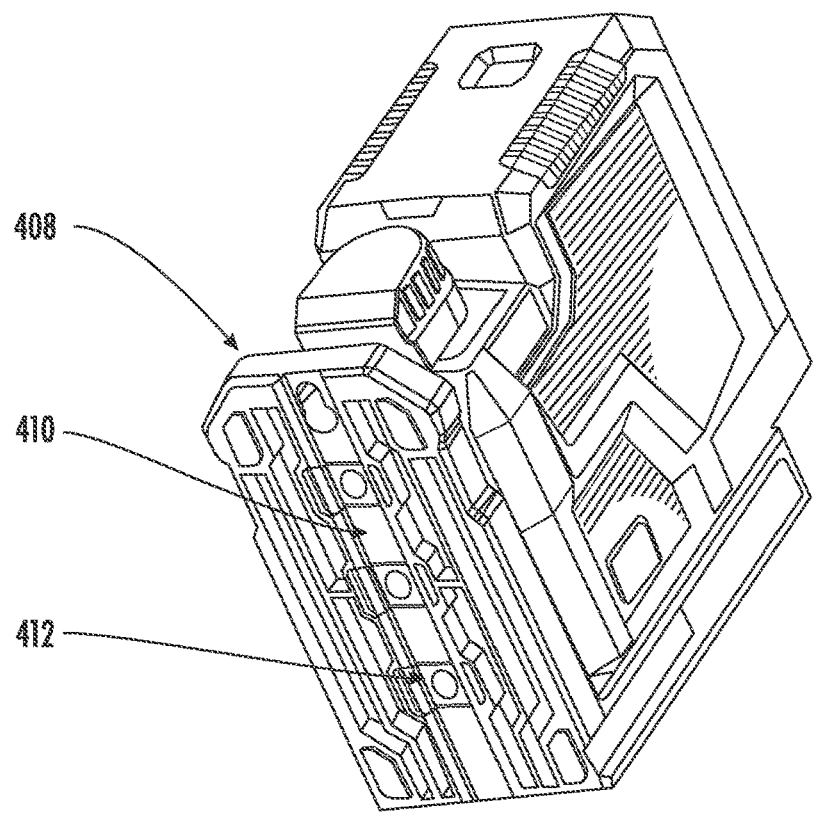
Figure 33:
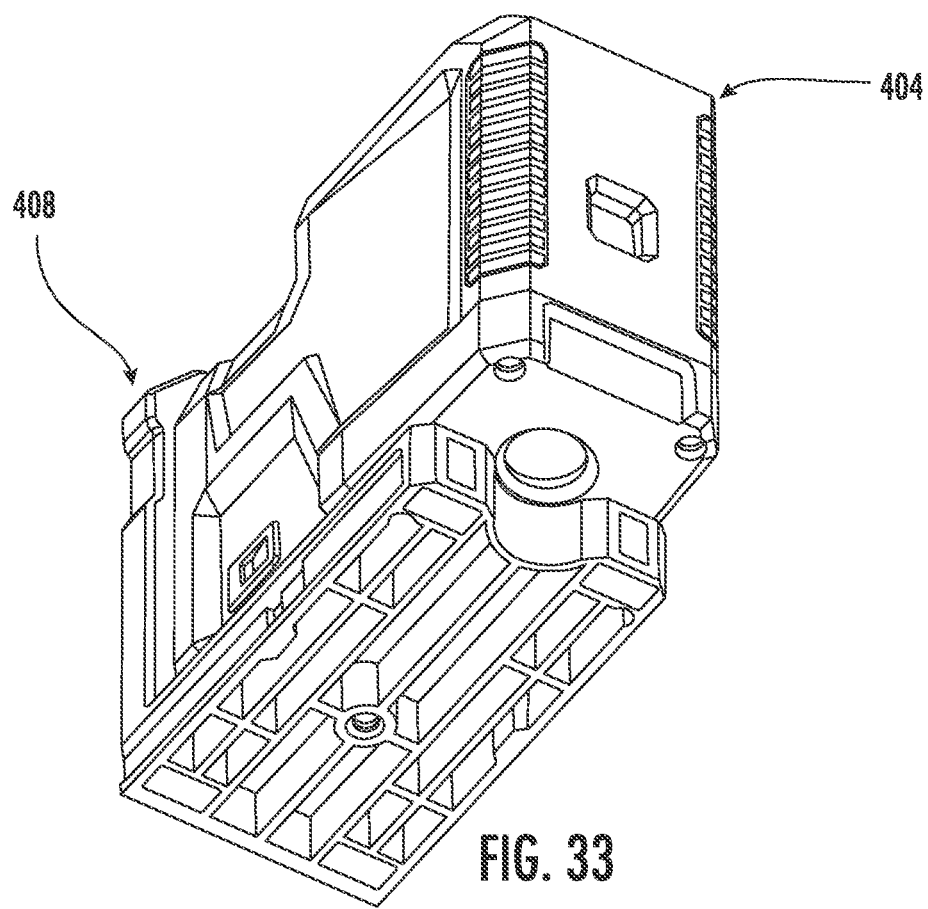
Figure 34:
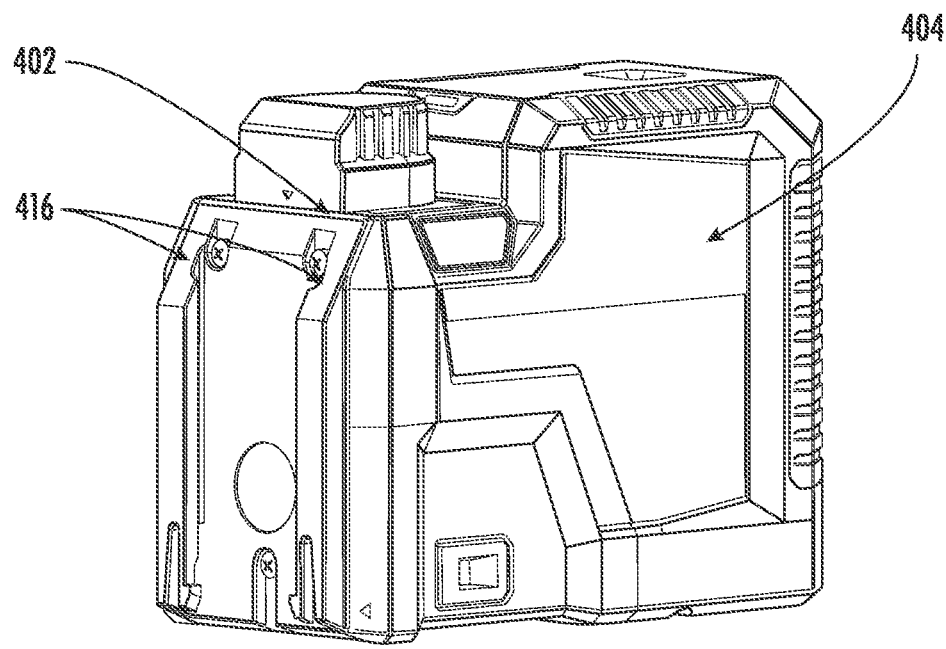

Turning to FIGS. 28-29, clip 360 facilitates coupling a laser projection device, such as a laser level, to a structure, such as an I-beam. Actuating interface 362 can be manipulated by a user to engage or disengage clamp 364. When actuated to an engaging position, clamp 364 couples around the horizontal wall of an I-beam. Clamp 364 can be coupled to a laser projection device via projection 368 that protrudes from outer surface 366. Projection 368 extends within a channel of the laser projection device, such as shown in FIGS. 31 and 32.

Turning to FIGS. 30-36, depicted therein are various aspects of laser projection device 400. Laser projection device 400 is similar to laser projection devices 10, 100, 150, and 200, except for the differences discussed therein. Housing 404 of laser projection device 400 is coupled to mount 408 via inner frame 402. Housing 404 defines one or more openings 406 through which a laser is projected from laser projection device 400. The laser projected from laser projection device 400 indicates an orientation of laser projection device 400, such as by projecting a line on a nearby wall or surface that is planar with a horizontal or vertical aspect of laser projection device 400.

Mount 408 defines channel 410 within which one or more magnets 412 are arranged. Channel 410 and magnets 412 facilitate coupling mount 408, and by extension laser projection device 400, to a cylindrical object, such as a metal pipe.

Figure 35:
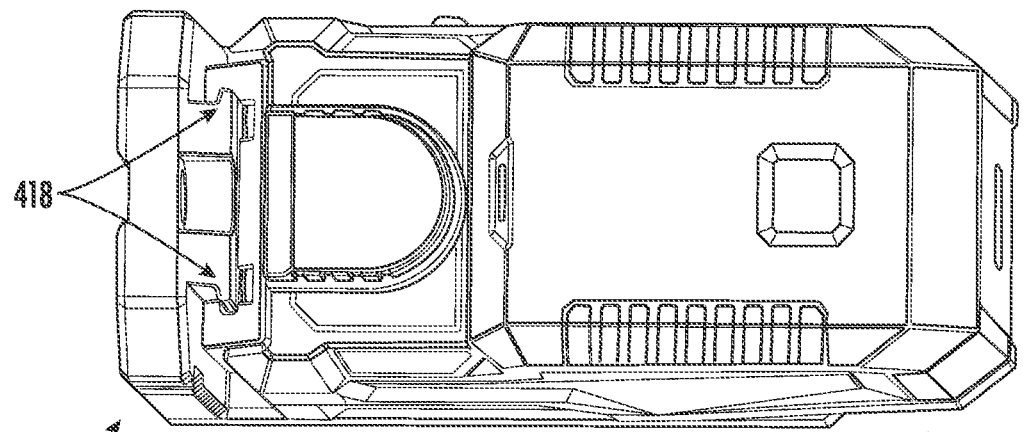

Laser projection device 400 is coupled to mount 408 via inner frame 402. Housing 404 is coupled to inner frame 402. Inner frame 402 is coupled to mount 408 via channels 416 (FIG. 34), which define a dovetail-style interface with lateral projections 418 (FIG. 35).

Figure 36:
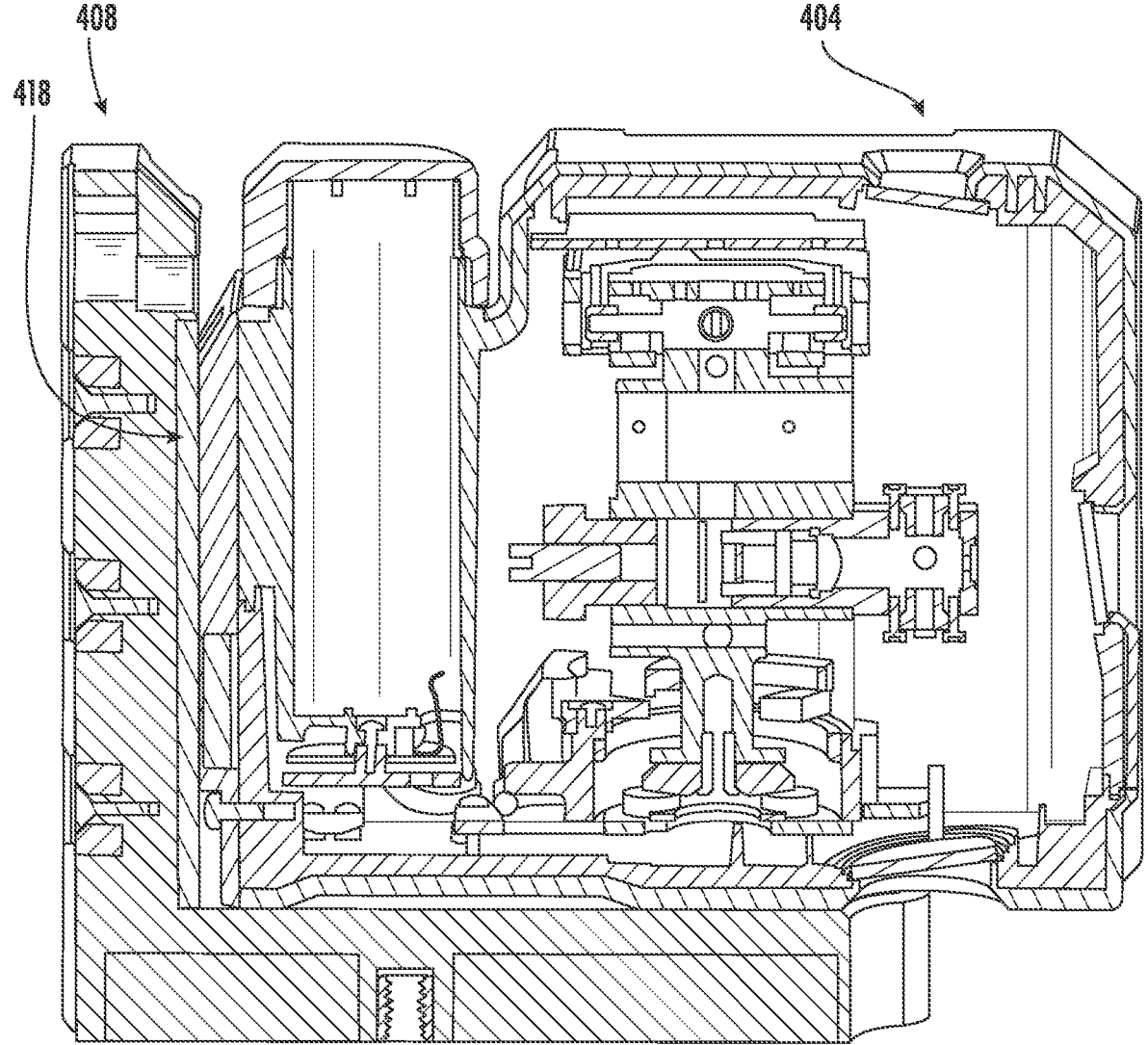
Figure 37:
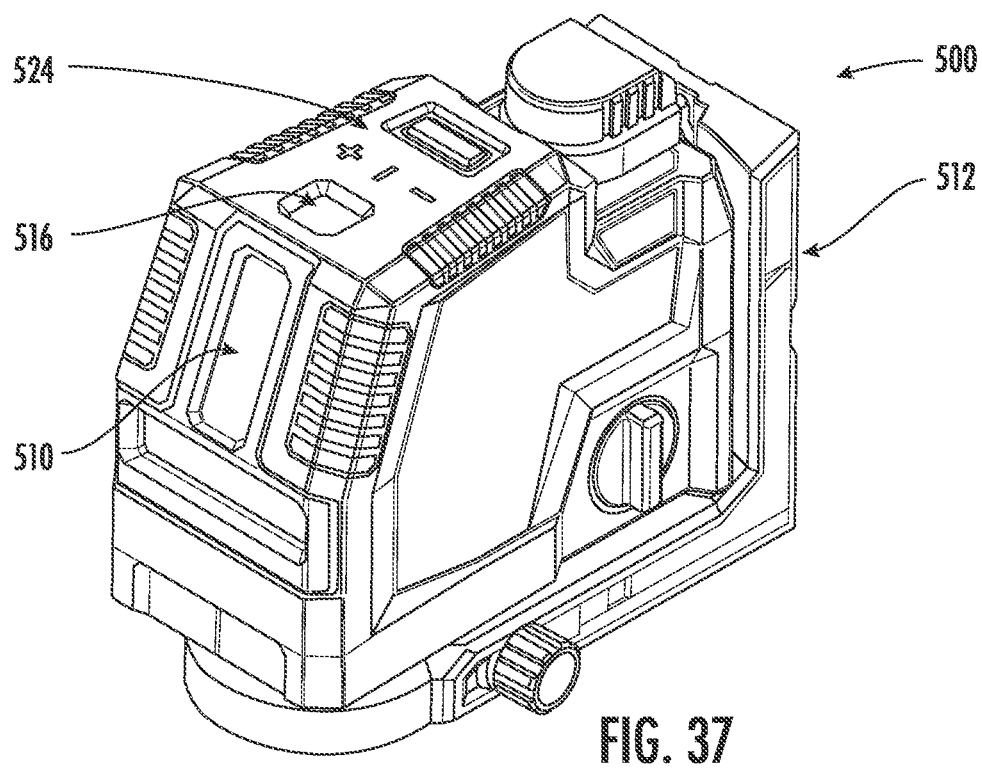
FIGS. 37-41 show a laser projection tool, according to an exemplary embodiment.

FIG. 36 depicts various aspects of laser projection device 400 as shown via a cross-sectional view. In addition to depicting various aspects of the internal functionality of laser projection device 400, FIG. 36 also depicts how projection 418 and channel 416 interface with each other.

Turning to FIGS. 37-41, depicted therein are various aspects of laser projection device 500. Laser projection device 500 is similar to laser projection devices 10, 100, 150, 200, and 400 except for the differences discussed therein. Housing 524 defines one or more openings 510 and 516 through which a laser is projected from laser projection device 500. The laser projected from laser projection device 500 indicates a positioning of laser projection device 500, such as by projecting a line on a nearby wall or surface that is planar with a horizontal or vertical aspect of laser projection device 500.

Housing 524 is mounted to frame 512. Frame 512 includes magnet interface 502, which is configured to interface with mounting devices, such as frame 302. Frame 512 defines aperture 514, which is aligned with laser opening 518 on the bottom of housing 524.

Turning to FIGS. 39-40, magnet interface 502 includes central recess 504, radial recesses 506, and magnetic interfacing components, shown as magnets 508. In use magnet interface 502 is coupled to frame 302 such that central recess 504 interfaces against central projection 308, radial recesses 506 interface against radial projections 310, and magnets 508 interface against magnets 304.

Figure 41:
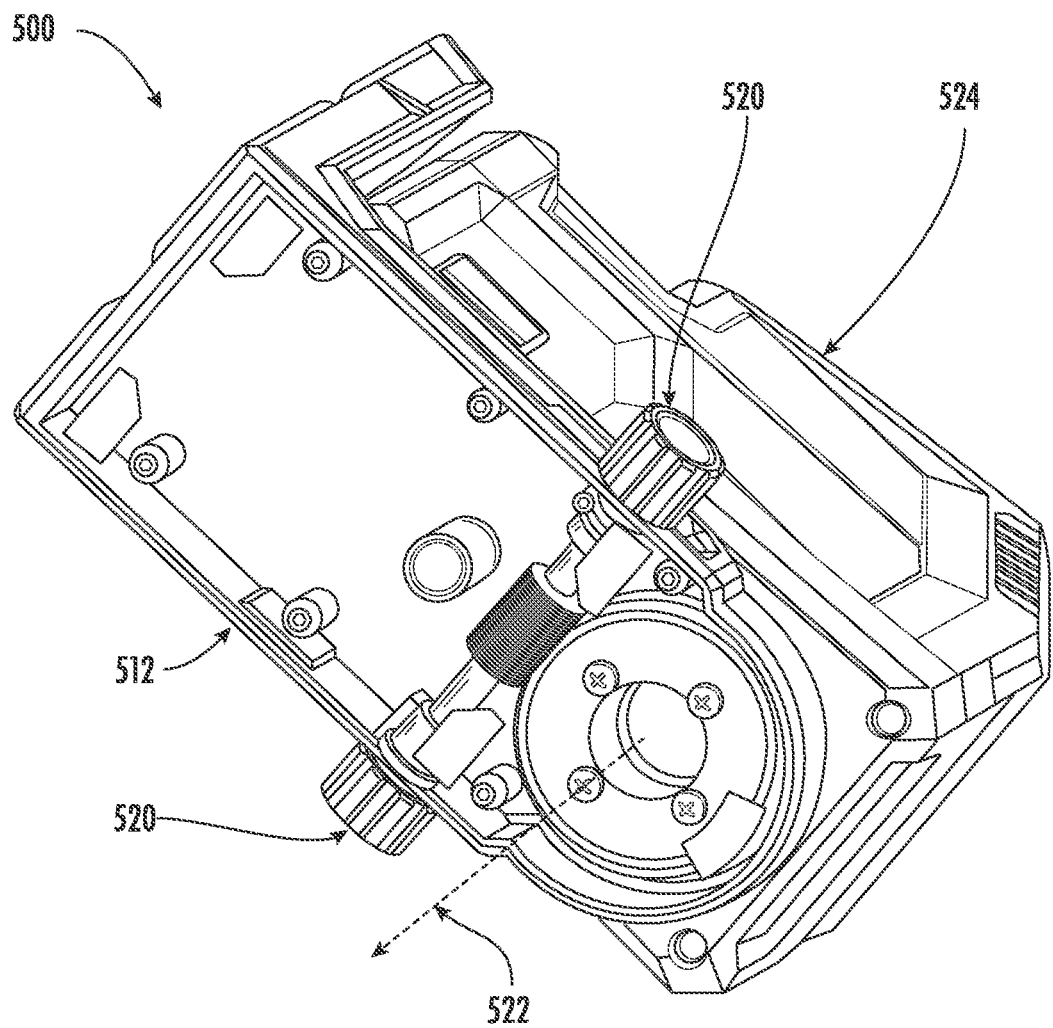
Figure 42:
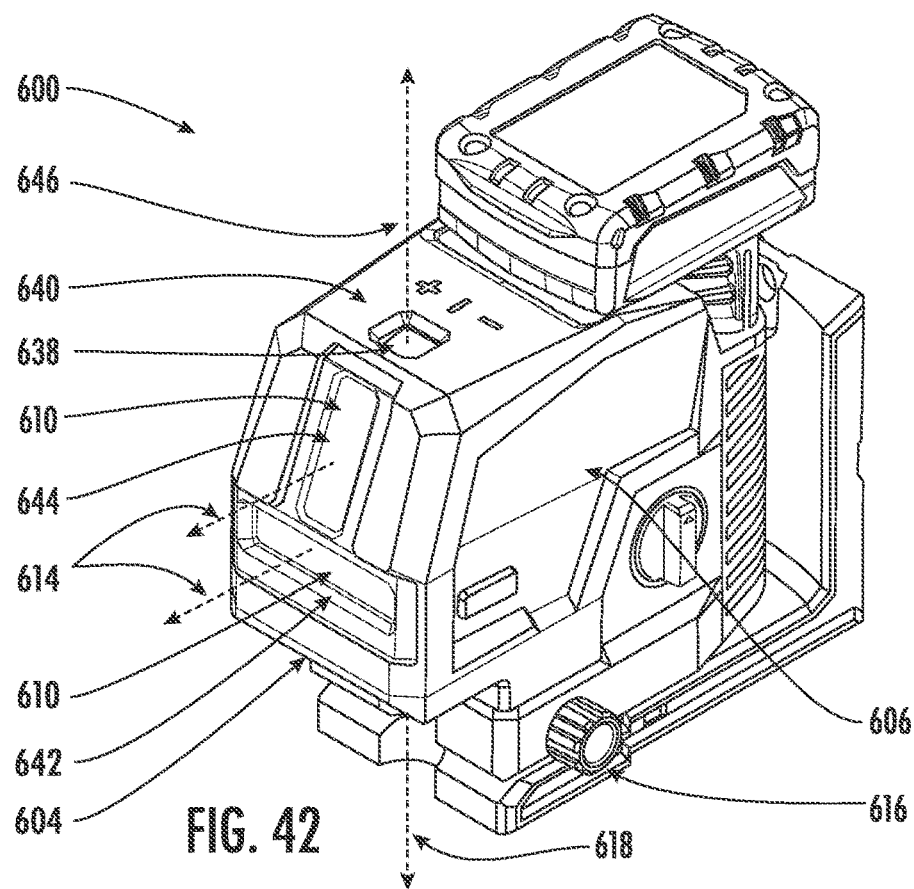
FIGS. 42-46 show a laser projection tool, according to an exemplary embodiment.
Figure 43:
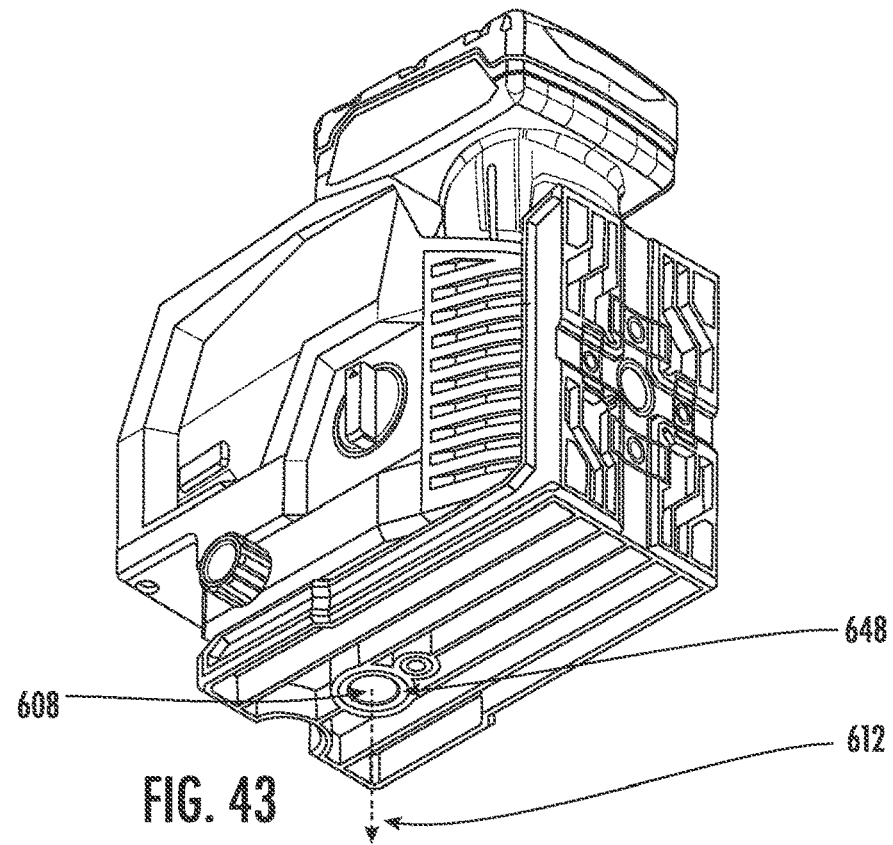

Turning to FIG. 41, housing 524 can be rotated about axis 522 with respect to frame 512. Housing 524 is rotated via actuating interface 520. As housing 524 is rotated, lasers emitted from opening 510 are correspondingly also emitted in rotating directions as lasers are emitted from housing 524.

Turning to FIGS. 42-46, depicted therein are various aspects of laser projection device 600. Laser projection device 600 is similar to laser projection devices 10, 100, 150, 200, 400, and 500 except for the differences discussed therein. Housing 604 defines one or more openings 640, 642, 644, and 648 through which laser(s) are projected from laser projection device 600. The lasers projected from laser projection device 600 indicate an orientation of laser projection device 600, such as by one or more laser emitting devices 606 projecting a line on a nearby wall or surface that is planar with a horizontal or vertical aspect of laser projection device 600. Laser emitted devices 606 are powered by one or more energy-supplying devices, such as battery 636.

In a specific embodiment, first laser 608 is emitted through opening 648 in direction 612 that is parallel to the direction of gravity as detected by a stationary and/or relatively stationary laser projection device 600. Second lasers 610 are emitted in direction 614, which is perpendicular to direction 612, towards a surface, such as a wall. In one use, second laser 610 emitted through opening 642 produces a horizontal line and second laser 610 emitted through opening 642 produces a vertical line, the horizontal and vertical lines depict an orientation of laser projection device 600. Third laser 638 is emitted in direction 646, which is parallel to direction 612. In a specific embodiment direction 646 of third laser 638 is aligned with direction 612 of first laser 608.

Figure 44:
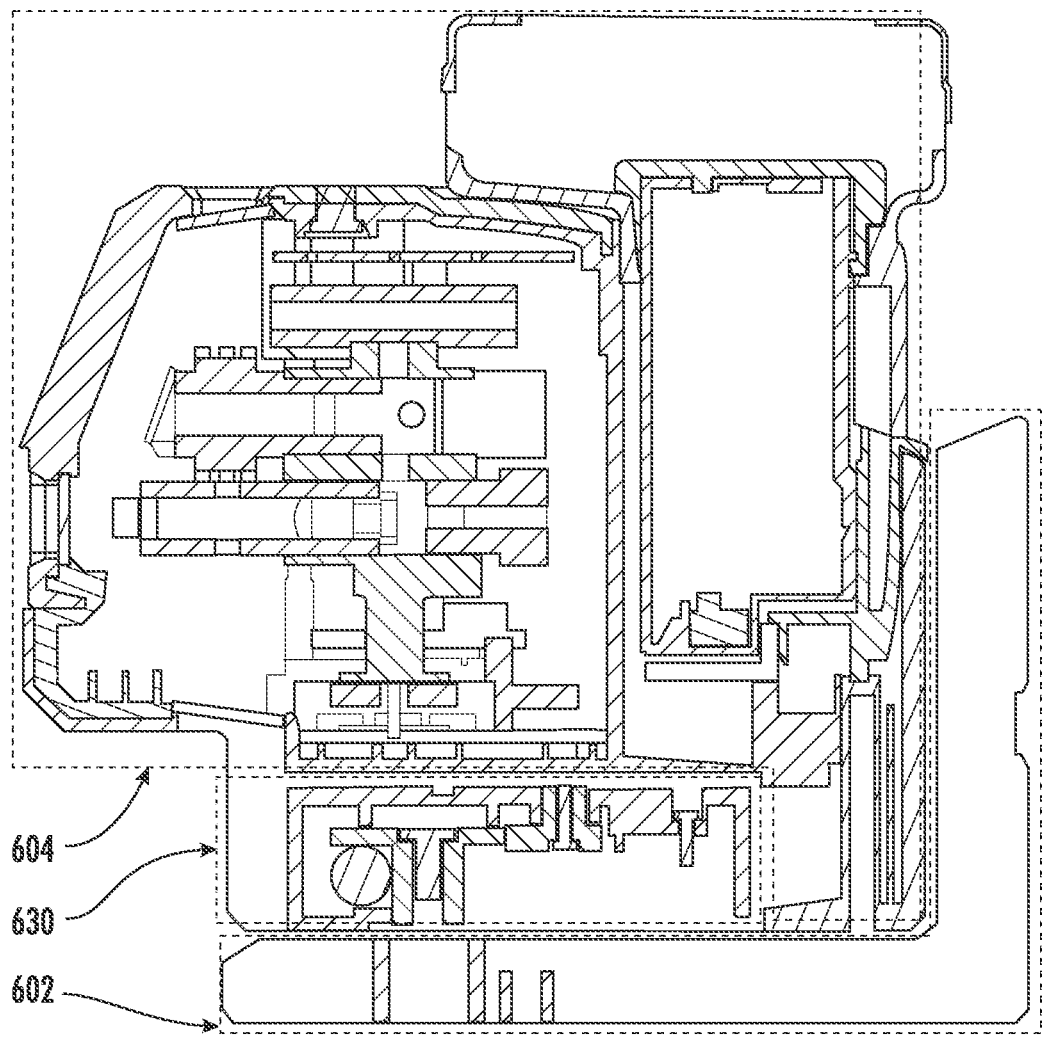
Figure 45:
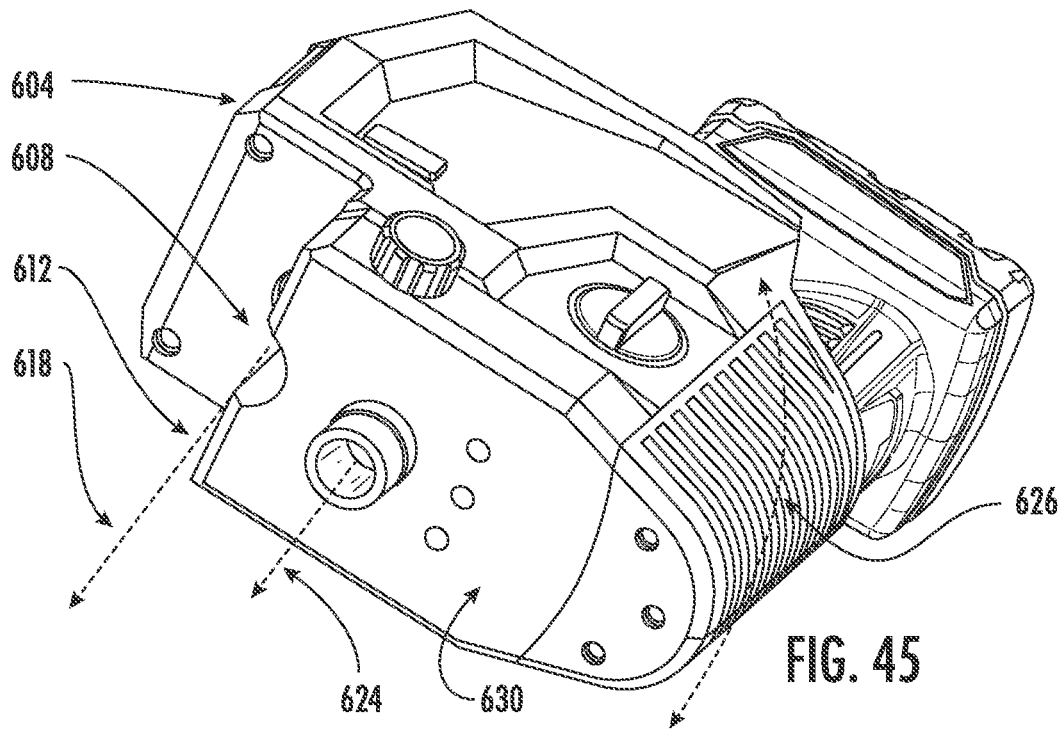
Figure 46:
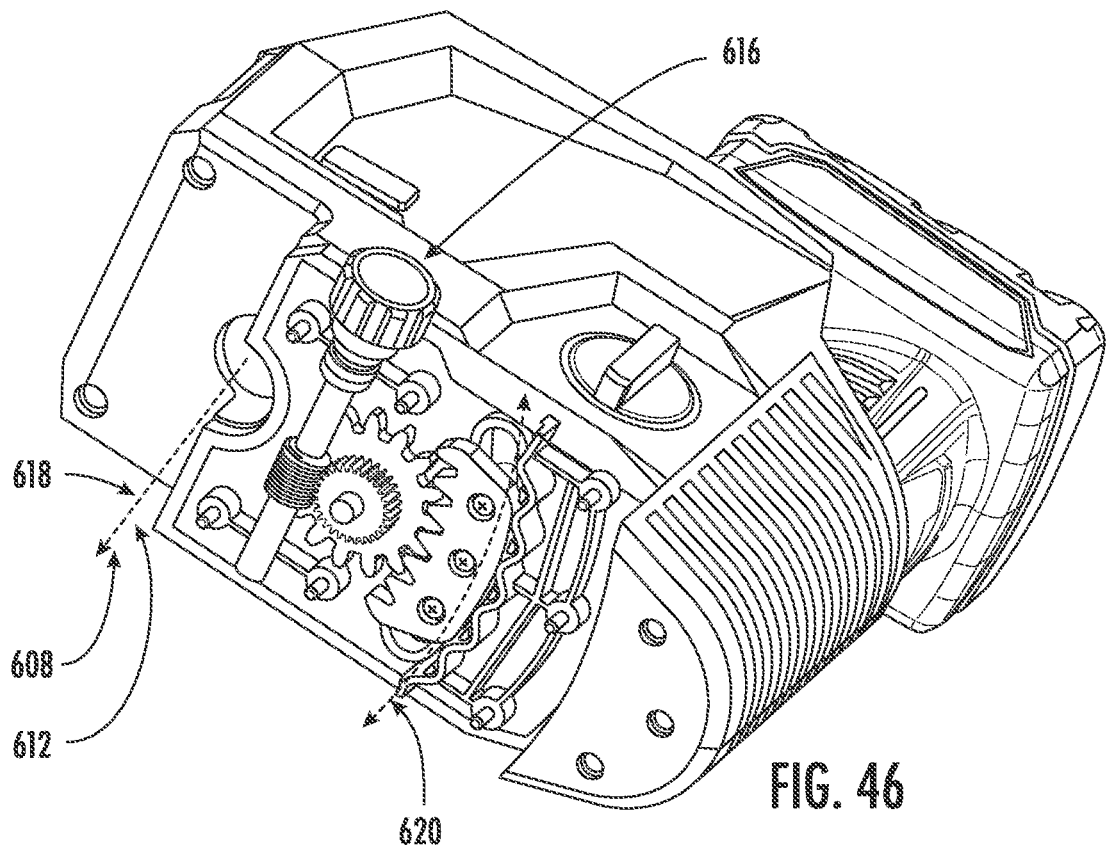

Turning to FIGS. 44-46, depicted therein is an innovate method of adjusting the positions of lasers emitted from laser projection device 600. Laser projection device 600 includes housing 604, which is pivotally coupled to intermediate component 630. Intermediate component 630 is pivotally coupled to L-frame 602.

In use, laser projection device 600 is aligned via a series of adjustments. First, the gross alignment of housing 604 and intermediate component 630 is performed, which adjusts the position of both the first laser 608 emitted towards the ground and the second horizontal lasers 610 emitted towards the wall. Second, the fine adjustment of housing 604 is performed, which only adjusts the position of second horizontal laser 610 emitted towards the wall while the position of first laser 608 emitted towards the ground remains stationary.

To detail these steps more particularly, housing 604 and intermediate component 630 can be rotated with respect to L-frame 602 in direction 626 about axis 624. However, as housing 604 and intermediate component 630 are rotated about axis 624, the position of first laser 608 emitted in direction 612 is also rotated, and thus the mark on the ground that first laser 608 produces also rotates.

Housing 604 can also be rotated with respect to intermediate component 630. As a user actuates mechanism 616 then housing 604 rotates in direction 620 around axis 618. Because housing 604 rotates with respect to intermediate component 630 about the axis 618, and axis 618 is aligned with direction 612 of first laser 608, the position of first laser 608 on the ground remains stationary while housing 604 is rotated with respect to intermediate component 630.

Thus, in use, first a user rotates both housing 604 and intermediate component 630 with respect to L-frame 602 until first laser 608 is aligned with a position on the ground and second laser 610 is nearly aligned with a position on the wall. Then, a user rotates housing 604 with respect to intermediate component 630 until second laser 610 is perfectly or nearly perfectly aligned with the position on the wall.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A frame for a laser projection device that projects a laser that indicates an orientation of the laser projection device, the frame comprises:
    a first plurality of magnets arranged around an axis, wherein the first plurality of magnets interface with a magnet interface coupled to the laser projection device; and
    a central projection centered on the axis, wherein the central projection interfaces with a central recess defined by a second frame coupled to the laser projection device;
    wherein the first plurality of magnets of the frame interact with the magnet interface of the laser projection device to couple the frame to the second frame of the laser projection device in a set of positions, and wherein the laser projection device can be repositioned at fixed intervals with respect to the frame to reposition the frame relative to the laser projection device from a first position of the set of positions to a second position of the set of positions.

2. The frame of claim 1, wherein the central projection defines a cylindrical shape.

3. The frame of claim 1, further comprising:
    a plurality of radial projections that are arranged symmetrically with respect to each other around the central projection, wherein the plurality of radial projections interface with a plurality of radial recesses defined by the second frame coupled to the laser projection device.

4. The frame of claim 3, wherein the plurality of radial projections are aligned radially with the first plurality of magnets around the central projection.

5. The frame of claim 3, wherein the plurality of radial projections comprise four radial projections that are arranged around the central projection at 90 degree intervals with respect to each other.

6. The frame of claim 1, wherein the first plurality of magnets interface with a second plurality of magnets in the magnet interface, wherein the second plurality of magnets are symmetrically arranged around the axis, and wherein the first plurality of magnets are symmetrically arranged around the axis.

7. The frame of claim 1, wherein the first plurality of magnets interface with four magnets in the magnet interface, wherein the four magnets are symmetrically arranged around the axis at 90 degree intervals with respect to each other, and wherein the fixed intervals comprise a plurality of 90 degree intervals.

8. The frame of claim 1 further comprising a first wall and a second wall that extend from each other and are perpendicular with respect to each other, wherein the first plurality of magnets are coupled to the first wall.

9. The frame of claim 8, wherein the second wall defines a semi-circular cutout, wherein the laser projection device emits a second laser in a second direction through the semi-circular cutout, wherein the second direction is parallel to the force of gravity.

10. The frame of claim 8, further comprising a height adjustment mechanism that extends and retracts the first wall with respect to the second wall.

11. A frame for a laser projection device that indicates an orientation of the laser projection device, the frame comprises:
    a first leg having a first outer surface;
    a second leg having a second outer surface, wherein the first outer surface and the second outer surface both face away from the laser projection device;
    a first channel defined by the first outer surface, the first channel extends along a first axis;
    a first magnet disposed within the first channel;
    a second channel defined by the second outer surface, the second channel extends along a second axis, wherein the first axis is not co-axial with the second axis; and
    a second magnet disposed within the second channel.

12. The frame of claim 11, wherein the first axis is perpendicular to the second axis.

13. The frame of claim 11, further comprising:
    a first plurality of magnets disposed within the first channel and aligned along the first axis, the first plurality of magnets including the first magnet; and
    a second plurality of magnets disposed within the second channel and aligned along the second axis, the second plurality of magnets including the second magnet.

14. The frame of claim 11, wherein the first outer surface defines a first coupling aperture that is configured to couple the laser projection device to a wall, and wherein the second outer surface defines a second coupling aperture configured to couple the laser projection device to an object, and wherein the second coupling aperture is a threaded aperture.

15. A laser projection device comprising:
    a housing;
    a first laser light emitting device supported by the housing, wherein the first laser light emitting device projects a first laser in a first direction from the housing, wherein the first laser indicates an orientation of the housing with respect to gravity, wherein the first light emitting device further projects a second laser in a second direction from the housing, wherein the second direction is perpendicular to the first direction;
    an intermediate component coupled to the housing;
    an inner frame coupled to the intermediate component;
    a first adjustment mechanism that, when actuated, adjusts the first direction of the first laser and the second direction of the second laser; and a second adjustment mechanism that, when actuated, adjusts the first direction of the first laser but does not adjust the second direction of the second laser;
wherein the second adjustment mechanism rotates the intermediate component with respect to the housing around a first axis; and
wherein the first adjustment mechanism rotates the inner frame with respect to both the intermediate component and the housing around a second axis.

16. The laser projection device of claim 15, wherein the second direction is parallel to the force of gravity.

17. The laser projection device of claim 15, wherein the second direction of the second laser is co-axial with the second axis.

18. The laser projection device of claim 15, further comprising a plurality of magnets arranged on an outer surface of the inner frame, the outer surface facing away from the housing, the plurality of magnets arranged symmetrically around a third axis.

* * * * *